US006284412B1

(12) United States Patent
Minakata et al.

(10) Patent No.: US 6,284,412 B1
(45) Date of Patent: Sep. 4, 2001

(54) HYBRID POLYMERIC ELECTROLYTE AND NON-AQUEOUS ELECTROCHEMICAL DEVICE COMPRISING THE SAME

(75) Inventors: Takashi Minakata, Shizuoka-ken; Masanori Ikeda, Fuji; Toshio Imauti, Suzuka; Masakatsu Kuroki, Fuji, all of (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/029,823

(22) PCT Filed: Nov. 15, 1996

(86) PCT No.: PCT/JP96/03363

§ 371 Date: Mar. 9, 1998

§ 102(e) Date: Mar. 9, 1998

(87) PCT Pub. No.: WO97/18596

PCT Pub. Date: May 22, 1997

(30) Foreign Application Priority Data

Nov. 15, 1995 (JP) ..................................... 7-296517

(51) Int. Cl.[7] ............................ H01M 10/40; H01M 2/16
(52) U.S. Cl. ........................................ 429/303; 429/300
(58) Field of Search .................................. 429/300, 303, 429/316

(56) References Cited

U.S. PATENT DOCUMENTS 4,384,047 * 5/1983 Benzinger et al. ..................... 521/64
5,296,318    3/1994 Gozdz et al. .
5,429,891    7/1995 Gozdz et al. .
5,547,551 * 8/1996 Bahar et al. ........................ 204/296
5,916,505 * 6/1999 Cisar et al. ............................ 264/85
5,922,493 * 7/1999 Humphrey, Jr. et al. ............ 429/316
5,928,391 * 7/1999 Lewin ................................ 29/623.5

FOREIGN PATENT DOCUMENTS 0730316   12/1995  (EP) .
63-40270   2/1988  (JP) .
4-204522   7/1992  (JP) .
5-342906  12/1993  (JP) .

* cited by examiner

*Primary Examiner*—Carol Chaney
(74) *Attorney, Agent, or Firm*—Birch, Stewart, Kolasch & Birch, LLP

(57) ABSTRACT

Disclosed is a novel hybrid polymeric electrolyte formed of a closed-cell cellular polymer foam impregnated with a non-aqueous electrolytic liquid, which comprises a plurality of closed cells defined by cell walls constituting a continuous solid-phase matrix which is impregnated with the non-aqueous electrolytic liquid to form a continuous solid-phase domain, in which the plurality of closed cells are substantially filled with a non-aqueous electrolytic liquid to form a plurality of liquid phase domains which are dispersed in the above-mentioned continuous solid-phase domain. The hybrid polymeric electrolyte of the present invention has not only high ionic conductivity and high mechanical strength, but also has the ability to prevent the non-aqueous electrolytic liquid from leakage. The non-aqueous electrochemical device comprising the hybrid polymeric electrolyte of the present invention exhibits excellent electrochemical performance, and also retains electrolytic liquid well.

26 Claims, No Drawings

HYBRID POLYMERIC ELECTROLYTE AND NON-AQUEOUS ELECTROCHEMICAL DEVICE COMPRISING THE SAME

This application is the national phase under 35 U.S.C. §371 of prior PCT International Application No. PCT/JP 96/03363 which has an International filing date of Nov. 15, 1996 which designated the United States of America, the entire contents of which are hereby incorporated by reference.

BACKGROUND OF THE INVENTION

1. Field of the Invention

The present invention relates to a novel polymeric electrolyte and an electrochemical device comprising the same. More particularly, the present invention is concerned with a novel hybrid polymeric electrolyte which is formed of a closed-cell cellular polymer foam impregnated with a non-aqueous electrolytic liquid and which comprises a plurality of closed cells defined by cell walls constituting a continuous solid-phase matrix impregnated with the non-aqueous electrolytic liquid to form a continuous solid-phase domain, wherein each of the plurality of closed cells is substantially filled with a non-aqueous electrolytic liquid to form a plurality of liquid phase domains which are dispersed in the above-mentioned continuous solid-phase domain. The present invention is also concerned with a non-aqueous electrochemical device, such as a non-aqueous battery or parts for a battery (e.g., an electrode), which comprises the above-mentioned hybrid polymeric electrolyte. The hybrid polymeric electrolyte of the present invention has not only high ionic conductivity and high mechanical strength, but also has the ability to prevent the non-aqueous electrolytic liquid contained therein from leakage, so that the electrolyte of the present invention can be advantageously used in various non-aqueous electrochemical devices. That is, the non-aqueous electrochemical device comprising the hybrid polymeric electrolyte of the present invention exhibits not only excellent electrochemical performance, but also has high ability to retain an electrolytic liquid therein, so that the electrochemical device-has excellent safety and high reliability in practical use thereof.

2. Prior Art

Recently, for reducing the size and weight of portable equipment, such as pocket telephones and personal computers, it has been demanded to provide a battery having high energy density. As a battery for meeting such a demand, lithium batteries have been developed and commercially produced. These lithium batteries are wet type batteries which contain a porous polyolefin separator having through-holes, wherein the pores of the separator are filled with a non-aqueous electrolytic solution which is used as a medium for transporting ions between the positive and negative electrodes. However, wet type batteries have problems in that a leakage of the non-aqueous electrolytic solution is likely to occur and it is difficult to realize light weight batteries.

By contrast, solid type batteries produced using a solid electrolyte are free from a leakage of an electrolytic solution, differing from the above-mentioned wet type batteries using a non-aqueous electrolytic solution as such. Therefore, it is expected that a solid electrolyte not only provides a battery having improved reliability and safety, but is also advantageous in that both the lamination of a solid electrolyte with electrodes, and the packaging of the resultant laminate to form a battery can be easily performed, and the thickness and weight of a battery can be reduced. As materials for such a solid electrolyte, ion-conductive ceramics and polymeric solid electrolytes have been proposed. Of these materials, the ion-conductive ceramic is disadvantageous in that a ceramic is brittle, so that it is difficult to produce a laminate structure of a ceramic with electrodes. By contrast, the polymeric solid electrolyte inherently has good workability and flexibility, so that the polymeric solid electrolyte is advantageous in that when it is used in an electrochemical device, such as a battery, it is easy to produce a laminate structure of the polymeric solid electrolyte with electrodes, and also the polymeric solid electrolyte is capable of allowing the configuration of its interface with the electrodes to change in accordance with the volumetric change of the electrodes caused by the occlusion and release of ions by the electrodes.

As such a polymeric solid electrolyte, an alkali metal salt complex of polyethylene oxide was proposed by Wright in British Polymer Journal, vol. 7, p. 319 (1975). Since then, researches on various materials for polymeric solid electrolytes have been energetically conducted. Examples of such materials include polyalkylene ethers, such as polyethylene glycol and polypropylene oxide, polyacrylonitrile, polyphosphazene, polyvinylidene fluoride and polysiloxane.

Generally, these polymeric solid electrolytes are provided in the form of solid solutions of an electrolyte and a polymer, and are known as dry type polymeric electrolytes. Further, gelled polymeric solid electrolytes are known which are obtained by incorporating an electrolyte and a solvent for the electrolyte into a polymer matrix, wherein the solvent is intended for increasing the dissociation of the electrolyte and promoting the molecular movement of the polymer (see, for example, Japanese Patent Application Laid-Open Specification No. 57-143356). As a method for introducing an electrolyte and a solvent for the electrolyte into a polymer matrix, there have been known, for example, a method in which a uniform solution of a polymer, an electrolyte and a solvent for the electrolyte is cast into a film (see, for example, U.S. Pat. No. 5,296,318), and a method in which a mixture of a polymer and a plasticizer is cast into a film; the plasticizer is extracted from the film to obtain a polymer matrix, and the polymer matrix is impregnated with an electrolytic solution obtained by dissolving an electrolyte in a solvent for the electrolyte, or, alternatively, after the casting of the film, the plasticizer in the film is replaced by an electrolytic solution. In the latter method, the use of the plasticizer in addition to the solvent for the electrolyte is intended to facilitate the swelling of the polymer.

The polymer used for production of the above-mentioned gelled polymeric solid electrolyte is a polymer which can easily form a uniform solution with an electrolyte and a solvent therefor. Therefore, for example, when a vinylidene fluoride polymer is used as the polymer, the obtained gelled polymeric solid electrolyte easily melts at 85° C. to 110° C. to exhibit flowability, so that there is a danger that a battery using such a gelled polymeric solid electrolyte suffers short circuiting at high temperatures, thus posing a safety problem. For solving this problem, a hybrid polymeric electrolyte has been proposed which is obtained by a method in which a mixture of a polymer, a plasticizer and a polymerizable vinyl monomer is cast into a film; the polymerizable vinyl monomer is cross-linked; the plasticizer is extracted from the film to obtain a polymer matrix; and the polymer matrix is impregnated with. an electrolytic solution (see U.S. Pat. No. 5,429,891). However, this method is disadvantageous not only in that the practice of this method is cumbersome, but also in that the polymerizable vinyl monomer is electrochemically unstable, and the plasticizer and the polymerizable vinyl monomer are susceptive to side reactions at the time of the cross-linking. Therefore, this hybrid polymeric electrolyte cannot be practically used for a battery.

As polymeric solid electrolytes having improved mechanical strength, there have been proposed a composite polymeric solid electrolyte obtained by introducing an ion-conductive polymer, such as polyethylene oxide, into a porous olefin polymer having through-holes (Japanese Patent Application Laid-Open Specification No. 63-102104); a polymeric solid electrolyte obtained by casting into a film a mixture of an ion-conductive polymer latex and an ion non-conductive polymer latex (Japanese Patent Application Laid-Open Specification No. 4-325990); and a polymeric solid electrolyte having a structure such that ceramic particles are dispersed in a polymer (Japanese Patent Application Laid-Open Specification No. 2-276164).

On the other hand, a miniature battery using, as a separator, a polyurethane foam porous material has been proposed (German Democratic Republic Patent No. 241159). However, the separator illustratively disclosed in this prior art is a separator having through-holes. Further, since the separator has a urethane linkage, the separator has a problem in that it is electrochemically unstable. Also, a primary battery using as an electrolyte a sulfonated polystyrene foam has been proposed (Japanese Patent Application Laid-Open Specification No. 2-94261). However, a sulfonated polystyrene foam has problems in that it is difficult to impregnate it with a non-aqueous electrolytic solution, and that a sulfonated polystyrene has water absorptivity and it is difficult to remove water therefrom, so that a sulfonated polystyrene cannot be used for a non-aqueous battery.

These polymeric solid electrolytes have a problem in that the ion-conductivity of them is small as compared to that of an electrolytic liquid. Therefore, a battery produced using such a polymeric solid electrolyte has defects such that it has low charge/discharge current density and has high resistance. For this reason, development of a polymeric solid electrolyte having high ion-conductivity has been desired. The ion-conductivity of a dry type polymeric solid electrolyte, such as a solid solution of an electrolyte and polyethylene oxide, is very low, so that, when a battery using such a dry type polymeric solid electrolyte is operated at room temperature, the current density obtained is limited to an extremely low level. Further, a gelled polymeric solid electrolyte containing a plasticizer has high ion-conductivity as compared to a dry type polymeric solid electrolyte. However, when the amount of the plasticizer is increased in order to increase the ion conductivity, problems arise such that the mechanical strength becomes low and it becomes difficult to control the thickness of the polymeric solid electrolyte.

On the other hand, with respect to the lithium ion secondary battery currently in use, which contains a porous polyolefin separator wherein the pores of the separator are filled with an electrolytic solution (see, for example, Examined Japanese Patent Application Publication No. 59-37292), there is a problem in that a polyolefin has extremely low ion permeability, so that the ion conductivity of the polyolefin separator (having pores simply filled with an electrolytic solution) is low as compared to that of the electrolytic solution. Further, since the electrolytic solution filled in the pores of the polyolefin separator can easily flow out of the separator, it is necessary to package the battery structure in a very strong metallic casing having a large thickness.

SUMMARY OF THE INVENTION

The present inventors have made extensive and intensive studies to develop a polymeric electrolyte material which is free of the above-mentioned problems accompanying the conventional techniques, and which not only has a high ionic conductivity which is close to the ionic conductivity of a non-aqueous electrolytic solution per se, but also high processability and various excellent properties, such as high flexibility and mechanical strength. As a result, it has unexpectedly been found that when a closed-cell cellular polymer foam is impregnated with a non-aqueous electrolytic liquid, it becomes possible to obtain a hybrid structure, in which a polymer matrix constituted by cell walls defining a plurality of closed cells of the polymer foam is impregnated with the non-aqueous electrolytic liquid to form a continuous solid-phase domain, and in which the plurality of closed cells are substantially filled with the non-aqueous electrolytic liquid to form a plurality of liquid-phase domains which are dispersed in the above-mentioned continuous solid-phase domain, and that the above-mentioned hybrid structure can be advantageously used as an excellent solid electrolyte in a non-aqueous electrochemical device, which not only is capable of exhibiting high ionic conductivity and preventing the non-aqueous electrolytic liquid from leakage, but also exhibits high mechanical strength even when the hybrid structure contains a non-aqueous electrolytic liquid in a large amount.

Accordingly, it is a primary object of the present invention to provide a hybrid polymeric electrolyte. which not only has high ionic conductivity, but also is capable of preventing the non-aqueous electrolytic liquid from leakage.

It is another object of the present invention to provide an advantageous method for producing a hybrid polymeric electrolyte having the above-mentioned advantageous features.

It is a further object of the present invention to provide a non-aqueous electrochemical device, such as a non-aqueous battery or parts for a battery (e.g., an electrode), which comprises a hybrid polymeric electrolyte having the above-mentioned advantageous features.

The foregoing and other objects, features and advantages of the present invention will be apparent from the following detailed description and appended claims.

DETAILED DESCRIPTION OF THE PRESENT INVENTION

Essentially, according to the present invention, there is provided a hybrid polymeric electrolyte formed of a closed-cell cellular polymer foam impregnated with an electrolytic liquid, comprising:

a plurality of closed cells defined by cell walls constituting a continuous solid-phase domain for the hybrid polymeric electrolyte, the continuous solid-phase domain comprising a continuous solid polymer matrix impregnated with a non-aqueous electrolytic liquid selected from the group consisting of a solution of an electrolyte in a non-aqueous solvent and a liquid electrolyte, each of the plurality of closed cells being substantially filled with the non-aqueous electrolytic liquid to form a plurality of liquid-phase domains for the hybrid polymeric electrolyte which are dispersed in the continuous solid-phase domain.

For an easy understanding of the present invention, the essential features and various preferred embodiments of the present invention are enumerated below.

1. A hybrid polymeric electrolyte formed of a closed-cell cellular polymer foam impregnated with an electrolytic liquid, comprising:
   a plurality of closed cells defined by cell walls constituting a continuous solid-phase domain for the hybrid polymeric electrolyte,
   the continuous solid-phase domain comprising a continuous solid polymer matrix impregnated with a non-aqueous electrolytic liquid selected from the group consisting of a solution of an electrolyte in a non-aqueous solvent and a liquid electrolyte,
   each of the plurality of closed cells being substantially filled with the non-aqueous electrolytic liquid to form a plurality of liquid-phase domains for the hybrid polymeric electrolyte which are dispersed in the continuous solid-phase domain.

2. The hybrid polymeric electrolyte according to item 1 above, wherein the plurality of liquid-phase domains comprise major liquid-phase domains each having a size of 2 μm or more in terms of the average value of the long axis and short axis of each liquid-phase domain, the major liquid-phase domains being present in an amount of from 5 to 95% by volume, based on the entire volume of the hybrid polymeric electrolyte, and wherein the major liquid-phase domains contain effective liquid-phase domains having a size of from 2 to 50 μm in terms of the average value as defined above, the effective liquid-phase domains being present in an amount of 60% or more by volume, based on the total volume of the major liquid-phase domains.

3. The hybrid polymeric electrolyte according to item 1 or 2 above, which has an ionic conductivity of at least $1\times10^{-5}$ S/cm and which is substantially insusceptible to oxidation and reduction at an electric potential in the range of from 1 to 3 V as measured relative to a reference electrode of metallic lithium.

4. The hybrid polymeric electrolyte according to any one of items 1 to 3 above, wherein the continuous solid polymer matrix is free of an ionic group and migrating hydrogen.

5. The hybrid polymeric electrolyte according to any one of items 1 to 4 above, wherein the continuous polymer matrix comprises a vinylidene fluoride polymer.

6. The hybrid polymeric electrolyte according to any one of items 1 to 5 above, wherein the non-aqueous electrolytic liquid is contained in an amount in the range of from 10 to 98% by weight, based on the weight of the hybrid polymeric electrolyte.

7. The hybrid polymeric electrolyte according to any one of items 1 to 6 above, wherein the continuous solid polymer matrix comprises a crosslinked polymer segment having a crosslinked structure.

8. The hybrid polymeric electrolyte according to item 7 above, wherein the crosslinked structure of the crosslinked polymer segment is formed by electron beam irradiation.

9. The hybrid polymeric electrolyte according to item 7 or 8 above, wherein the continuous solid polymer matrix further comprises a non-crosslinked polymer segment, and wherein the weight ratio of the cross-linked polymer segment to the total weight of the crosslinked polymer segment and the non-crosslinked. polymer segment is in the range of from 0.2 to 0.8.

10. The hybrid polymeric electrolyte according to any one of items 1 to 9 above, wherein the non-aqueous electrolytic liquid is a solution of an electrolyte in a non-aqueous solvent.

11. The hybrid polymeric electrolyte according to item 10 above, wherein the electrolyte is a lithium salt.

12. The hybrid polymeric electrolyte according to item 10 or 11 above, wherein the non-aqueous solvent comprises at least one compound selected from the group consisting of a carbonate compound and an ester compound.

13. The hybrid polymeric electrolyte according to any one of items 1 to 12 above, which is in the form of a sheet having a thickness of from 5 to 500 μm.

14. A method for producing a hybrid polymeric electrolyte according to item 1 above, comprising impregnating a closed-cell cellular polymer foam with a non-aqueous electrolytic liquid selected from the group consisting of a solution of an electrolyte in a non-aqueous solvent and a liquid electrolyte, the polymer foam having a plurality of closed cells defined by cell walls constituting a continuous solid polymer matrix of the polymer foam.

15. The method according to item 14 above, wherein the amount of the plurality of closed cells of the polymer foam is in the range of from 5 to 98% by volume, based on the entire volume of the polymer foam.

16. The method according to item 15 above, wherein the plurality of closed cells comprise first and second fractions of closed cells, respectively, having a size of from 1 to 50 μm and a size of larger than 50 μm, each in terms of the average value of the long axis and short axis of each closed cell and wherein the first and second fractions of closed cells are, respectively, present in an amount of 60% or more by volume and in an amount of less than 40% by volume, each based on the total volume of the plurality of closed cells.

17. The method according to any one of items 14 to 16 above, wherein the impregnation of the polymer foam with the non-aqueous electrolytic liquid is conducted at a temperature of from 35 to 200° C.

18. The method according to any one of items 14 to 17 above, wherein the non-aqueous electrolytic liquid further comprises a swelling agent, and which further comprises removing at least a part of the swelling agent after the impregnation of the polymer foam with the non-aqueous electrolytic liquid.

19. The method according to any one of items 14 to 18 above, wherein the non-aqueous electrolytic liquid is used in an amount such that the produced hybrid polymeric electrolyte has an ionic conductivity of at least $1.0\times10^{-4}$ S/cm, and that the surface area of the produced electrolyte becomes 50 to 200%, relative to the surface area of the polymer foam prior to the impregnation with the non-aqueous electrolytic liquid.

20. The method according to any one of items 14 to 19 above, wherein the polymer foam has at least one construction selected from a construction in which the polymer foam comprises a crosslinked polymer segment having a crosslinked structure formed by electron beam irradiation, and a construction in which the polymer foam is in a stretched form.

21. A non-aqueous electrochemical device comprising at least two electrodes, and a hybrid polymeric electrolyte according to any one of items 1 to 13 above, wherein the at least two electrodes are disposed through the hybrid polymeric electrolyte.

22. An electrode comprising a particulate electrode material and a binder comprising a closed-cell cellular polymer foam comprising a plurality of closed cells defined by cell walls constituting a continuous solid polymer matrix of the polymer foam.

23. The electrode according to item 22 above, which is impregnated with a non-aqueous electrolytic liquid selected from the group consisting of a solution of an electrolyte in a non-aqueous solvent and a liquid electrolyte.

24. A method for producing an electrode according to item 22 above, comprising molding a mixture of a particulate electrode material and a particulate closed-cell cellular polymer foam comprising a plurality of closed cells defined by cell walls constituting a continuous solid polymer matrix of the polymer foam.

25. A method for producing an electrode according to item 22 above, comprising molding a mixture of a particulate electrode material and a polymer to obtain a molded product, and foaming the polymer in the molded product.

26. A non-aqueous electrochemical device comprising an electrode according to item 23 above.

27. The non-aqueous electrochemical device according to item 21 above, which is a lithium battery.

28. The non-aqueous electrochemical device according to item 26 above, which is a lithium battery.

As mentioned above, the hybrid polymeric electrolyte of the present invention is formed of a closed-cell cellular polymer foam impregnated with an electrolytic liquid and has a hybrid structure which comprises a plurality of closed cells defined by cell walls constituting a continuous solid-phase domain, in which the plurality of closed cells are substantially filled with a non-aqueous electrolytic liquid to form a plurality of liquid phase domains which are dispersed in the above-mentioned continuous solid-phase domain, and in which the above-mentioned continuous solid-phase domain is impregnated with the non-aqueous electrolytic liquid.

In the hybrid polymeric electrolyte of the present invention, it is preferred that the above-mentioned plurality of liquid-phase domains comprise major liquid-phase domains each having a size of 2 $\mu$m or more in terms of the average value of the long axis and short axis of each liquid-phase domain (hereinafter, frequently referred to simply as "the average value"), the major liquid-phase domains being present in an amount of from 5 to 95% by volume, based on the entire volume of the hybrid polymeric electrolyte, and wherein the major liquid-phase domains contain effective liquid-phase domains having a size of from 2 to 50 $\mu$m in terms of the average value, the effective liquid-phase domains being present in an amount of 60% or more by volume, based on the total volume of the major liquid-phase domains.

In the present invention, the volume percentage of the liquid-phase domains of the hybrid polymeric electrolyte is evaluated by the examination of the structure of cross-sections of the hybrid polymeric electrolyte. Specifically, a sheet of hybrid polymeric electrolyte is frozen with liquid nitrogen, and cut with a microtome, a razor or the like along three planes (X-Z plane, Y-Z plane and X-Y plane of the X, Y, Z coordinates wherein the X-Z plane and Y-Z plane are taken along a thicknesswise direction of the sheet) which are perpendicular to one another, to obtain a sample having first, second and third cross-sections corresponding, respectively, to the X-Z, Y-Z and X-Y planes. Each of the first, second and third cross-sections of the sample is examined by an optical microscope. With respect to each of the first, second and third cross-sections of the sample, cross-sections of liquid-phase domains, which are dispersed in the continuous solid-phase domain, are examined to determine the percentages of the total areas of cross-sections of the liquid-phase domains, based on the area of each cross-section of the sample. [In this instance, among the liquid-phase domains appearing in each cross-section of the sample, only those liquid-phase domains each having a size (average size) of 2 $\mu$m or more in terms of the average value of the long axis and short axis of each liquid-phase domain, are measured.] The average of the percentages of the respective total areas of cross-sections of the liquid-phase domains, obtained with respect to the first, second and third cross-sections of the sample, is calculated and taken as the volume percentage of the liquid-phase domains of the hybrid polymeric electrolyte. In the present invention, the volume of a liquid-phase domain communicating with the surface of the hybrid polymeric electrolyte is not included in the total volume of the liquid-phase domains. As apparatuses usable for examining liquidphase domains, there may be mentioned optical microscopes, such as a metallurgical microscope and a laser microscope; a differential pressure electron microscope; an ultrasonic microscope; and an X-ray CT. Of these, by using an ultrasonic microscope or an X-ray CT, examination of a sample can be performed without exposing a cross-section of the sample.

When the amount of the major liquid-phase domains each having an average size of 2 $\mu$m or more is less than 5% by volume, based on the entire volume of the hybrid polymeric electrolyte, the ionic conductivity becomes low. On the other hand, when the amount of the major liquid-phase domains each having an average size of 2 $\mu$m or more is larger than 95% by volume, based on the entire volume of the hybrid polymeric electrolyte, the mechanical strength of the hybrid polymeric electrolyte becomes low. It is more preferred that the volume percentage of the major liquid-phase domains be from 10 to 90%, based on the entire volume of the hybrid polymeric electrolyte.

Further, as mentioned above, it is preferred that the amount of the major liquid-phase domains each having an average size of more than 50 $\mu$m be less than 40% by volume, based on the total volume of the major liquid-phase domains. It is more preferred that the amount of the major liquid-phase domains each having an average size of more than 50 $\mu$m be less than 30% by volume, still more preferably less than 20% by volume, based on the total volume of the major liquid-phase domains. When the amount of the major liquid-phase domains each having an average size of more than 50 $\mu$m is 40% by volume or more, based on the total volume of the major liquid-phase domains, since the flow of ions is large at portions of the hybrid polymeric electrolyte where a large number of large liquid-phase domains are present, non-uniformity is produced in the flow of ions within the hybrid polymeric electrolyte, so that when the hybrid polymeric electrolyte is used for a battery, problems tend to arise such that local overcharge or overdischarge occurs at the time of charge or discharge. In addition, when the amount of the major liquid-phase domains each having an average size of more than 50 $\mu$m is 40% by volume or more, based on the total volume of the major liquid-phase domains, possibilities arise such that the mechanical strength of the hybrid polymeric electrolyte becomes low and distortion occurs.

In the present invention, liquid-phase domains having an average size of less than 2 $\mu$m are regarded as the electrolytic liquid impregnated in the continuous solid polymer matrix.

Important liquid-phase domains in the hybrid polymeric electrolyte of the present invention are closed liquid-phase domains not communicating with the surface of the hybrid polymeric electrolyte. The hybrid polymeric electrolyte may contain liquid-phase domains opening on the surface of the hybrid polymeric electrolyte, and liquid-phase domains constituting through-holes. However, it is preferred that the total volume of the liquid-phase domains opening on the surface of the hybrid polymeric electrolyte and the liquid-phase domains constituting through-holes be less than 5%, based on the entire volume of the hybrid polymeric electrolyte. It is especially preferred to reduce the total volume of liquid-phase domains constituting through-holes to a level as low as possible. When the hybrid polymeric electrolyte contains liquid-phase domains constituting through-holes, leakage of the non-aqueous electrolytic liquid is likely to occur.

For selecting a desired hybrid polymeric electrolyte in which the volume of through-holes is small, there can be employed the following method; with respect to a polymeric electrolyte in the form of a sheet, the volume of through-holes in the polymeric electrolyte sheet is evaluated in terms of the water permeability as an evaluation criterion, which is generally used for evaluating the permeability of filter materials. Illustratively stated, a hybrid polymeric electrolyte sheet containing an electrolytic liquid is first immersed in ethanol to extract the electrolytic liquid from the sheet and replace the electrolytic liquid by the ethanol, and then immersed in water to replace the ethanol in the open cells (which communicate with the surface of the sheet) by water. Subsequently, the resultant sheet is held by a membrane holder and a water pressure is applied to the surface of one side of the sheet held by the membrane holder to permeate the water through the sheet, and the amount of the water permeated through the sheet is measured. In the hybrid polymeric electrolyte of the present invention, it is preferred that the amount of the water permeated through the sheet be 10 liters/m$^2$·hr·atm or less as measured by the above-mentioned method, wherein the sheet used is one which has been immersed in ethanol for 4 hours and in water for 1 hour successively.

In the hybrid polymeric electrolyte of the present invention, it is preferred that the non-aqueous electrolytic liquid be contained in an amount in the range of from 10 to 98% by weight, more preferably from 15 to 95% by weight, based on the weight of the hybrid polymeric electrolyte. When the content of the non-aqueous electrolytic liquid in the hybrid polymeric electrolyte is less than 10% by weight, the ionic conductivity of the hybrid polymeric electrolyte becomes too low. On the other hand, when the content of the non-aqueous electrolytic liquid in the hybrid polymeric electrolyte is more than 98% by weight, the mechanical strength of the hybrid polymeric electrolyte becomes too low.

The content of the non-aqueous electrolytic liquid in the hybrid polymeric electrolyte of the present invention can be determined from the weight (P) of the polymer foam prior to the impregnation of the non-aqueous electrolytic liquid and the weight (E) of the hybrid polymeric electrolyte after the impregnation of the non-aqueous electrolyte liquid in accordance with the formula below. Alternatively, the content of the non-aqueous electrolytic liquid in the hybrid polymeric electrolyte can be determined by extracting the non-aqueous electrolytic liquid from the hybrid polymeric electrolyte impregnated with the non-aqueous electrolytic liquid, followed by drying, and subtracting the weight (P) of the dried polymer from the weight (E) of the hybrid polymeric electrolyte impregnated with the non-aqueous electrolytic liquid in accordance with the formula below.

$$\text{Content (\% by weight) of electrolytic liquid}=100\times(E-P)/E.$$

The hybrid polymeric electrolyte of the present invention comprises the above-mentioned plurality of liquid-phase domains and a continuous solid-phase domain comprising a swollen continuous solid polymer matrix impregnated with a non-aqueous electrolytic liquid (hereinafter, frequently referred to simply as "polymer phase"). The amount of non-aqueous electrolytic liquid in the polymer phase impregnated with the non-aqueous electrolytic liquid is preferably from 10 to 90% by weight.

The impregnation of the polymer phase of the hybrid polymeric electrolyte with the non-aqueous electrolytic liquid can be confirmed by determining the difference between the weight of the polymer phase [the weight of the polymer phase is determined from the difference between the weight of the hybrid polymeric electrolyte and the weight of the liquid-phase domains (which weight can be obtained from the volume of the liquid-phase domains)] and the weight of the polymer foam prior to the impregnation of the non-aqueous electrolytic liquid (or the weight of the polymer which is obtained by extracting the non-aqueous electrolytic liquid from the hybrid polymeric electrolyte and subjecting the resultant polymer to drying). Alternatively, the impregnation of the polymer phase of the hybrid polymeric electrolyte with the non-aqueous electrolytic liquid can be confirmed by observing the lowering of both the melting temperature and the glass transition temperature of the polymer phase after the impregnation of non-aqueous electrolytic liquid as compared to those temperatures prior to the impregnation. The measurement of both the melting temperature and the glass transition temperature can be performed by differential thermal analysis. The relationship between the content of non-aqueous electrolytic liquid in the polymer phase and each of the melting temperature and the glass transition temperature varies depending on the type of the polymer. The content of the non-aqueous electrolytic liquid in the polymer phase can be determined from the relationship between the content of the non-aqueous electrolytic liquid in the polymer and each of the melting temperature and the glass transition temperature of the polymer. When the content of non-aqueous electrolytic liquid in the polymer phase is less than 10% by weight, the ionic conductivity of the hybrid polymeric electrolyte becomes too low. On the other hand, when the content of non-aqueous electrolytic liquid in the polymer phase is more than 90% by weight, the mechanical strength of the polymer phase becomes undesirably low.

The hybrid polymeric electrolyte of the present invention has a high ionic conductivity. Specifically, it is preferred that the hybrid polymeric electrolyte have an ionic conductivity of at least $1\times10^{-5}$ S/cm, preferably at least $1\times10^{-4}$ S/cm. The measurement of the ionic conductivity of the hybrid polymeric electrolyte is conducted as follows: A sample of the hybrid polymeric electrolyte is sandwiched between two metallic electrodes, and the sandwiched polymeric electrolyte is subjected to measurement of an alternating current impedance in accordance with the conventional method. The ionic conductivity is calculated from the real part of the complex impedance expressed in the form of a plot. The ionic conductivity (IC) is determined from the impedance (Z) of the sample, the area (A) of a portion of each of the electrodes which portion is contacted with the sample, and the thickness (L) of the sample in accordance with the following formula:

$$IC=L/(Z\times A).$$

The hybrid polymeric electrolyte of the present invention is characterized in the point as mentioned below, as compared to conventional polymeric electrolytes. With respect to a conventional polymeric electrolyte obtained by incorporating an electrolyte and a solvent for the electrolyte into a polymer, for the purpose of increasing the ionic conductivity of the polymeric electrolyte, it has been attempted to increase the content of the solvent in the polymeric electrolyte. However, this method poses a problem such that when the content of the solvent in the polymeric electrolyte is increased, the mechanical strength of the polymeric electrolyte becomes low. Therefore, with respect to the above-mentioned conventional polymeric electrolyte, from the viewpoint of achieving the mechanical strength suitable for practical use, the content of the solvent in the polymeric electrolyte is limited. Thus, the above-mentioned conventional polymeric electrolyte which is obtained by simply incorporating an electrolyte and a solvent for the electrolyte into a polymer contains an electrolytic liquid only in a small amount, so that the ionic conductivity of the polymeric electrolyte is low. On the other hand, the hybrid polymeric electrolyte of the present invention exhibits both a high mechanical strength and a high ionic conductivity even when the content of the non-aqueous electrolytic liquid in the hybrid polymeric electrolyte is high. Further, the ionic conductivity of the hybrid polymeric electrolyte of the present invention is high, as compared to a conventional polymeric electrolyte which is obtained by filling the pores of an ion-non-conductive porous material having through-holes (such as a porous polyolefin) with an electrolytic liquid. The reason for this has not been elucidated, but it is considered that the hybrid polymeric electrolyte of the present invention has an excellent ionic conductivity due to its hybrid structure wherein the hybrid polymeric electrolyte comprises a plurality of liquid-phase domains comprising a plurality of closed cells substantially filled with a non-aqueous electrolytic liquid and a continuous solid-phase domain comprising cell walls impregnated with the non-aqueous electrolytic liquid.

The hybrid polymeric electrolyte of the present invention is produced by impregnating a closed-cell cellular polymer foam with an electrolytic liquid. With respect to the volume percentage of the closed cells, based on the entire volume of the polymer foam, there is no particular limitation. However, for achieving the desired effect of the present invention, the amount of the closed cells of the polymer foam is selected from the range of from 5 to 98% by volume. When the amount of the closed cells is less than 5% by volume, a satisfactorily high ionic conductivity of the hybrid polymeric electrolyte cannot be achieved. In the present invention, the lower limit of the amount of the closed cells is preferably 20% by volume, more preferably 40% by volume. When the amount of the closed cells is more than 98% by volume, a satisfactorily high mechanical strength of the hybrid polymeric electrolyte cannot be achieved. Therefore, the upper limit of the amount of the closed cells is 98% by volume, preferably 97% by volume. The volume amount ratio of the closed cells can be obtained by subtracting, from the void ratio of a polymer foam, an open cell ratio determined in accordance with an air pycnometer method described in ASTM-D2856. Illustratively stated, the void ratio can be calculated from the specific gravity of the polymer foam and the specific gravity of the bulk polymer, and the closed cell ratio can be obtained by subtracting the open cell ratio (as measured by an air pycnometer) from the void ratio obtained above. As polymer foams for producing the hybrid polymeric electrolyte of the present invention, polymers having through-holes and/or open cells on the surface thereof in addition to the above-mentioned closed cells can also be used. However, a hybrid polymeric electrolyte obtained by impregnating such a polymer with an electrolytic liquid has problems in that a leakage of the electrolytic liquid from the through-holes or open cells is likely to occur, and thus it is preferred that the polymer have no through-holes or open cells, or that the amount of the through-holes and open cells be less than 5% by volume, based on the entire volume of the polymer. Volume percentages of these through-holes and open cells are not included in the volume percentage of the closed cells of the polymer foam. In the present invention, with respect to the shape of the cross-sections of closed cells of the polymer foam, there is no particular limitation, and the closed cells can take a shape of circle, ellipse or the like. With respect to the size of the closed cells of the polymer foam, each in terms of the average value of the long axis and short axis of each closed cell, there is no particular limitation since various size can be selected depending on the use of the polymer foam. Each of the closed cells generally has a size of from 100 nm to 100 $\mu$m, preferably from 1 $\mu$m to 50 $\mu$m.

In the present invention, it is preferred that closed cells having a size of from 1 to 50 $\mu$m be present in an amount of 60% or more by volume, based on the entire volume of the closed cells. Further, it is preferred that closed cells having a size of not smaller than 50 $\mu$m be present in an amount of less than 40% by volume, based on the entire volume of the closed cells. The lower limit of the expansion ratio (volume of polymer foam/volume of polymer prior to foaming) of the polymer foam is generally 1.05 times, preferably 1.25 times, more preferably 1.66 times. The upper limit of the expansion ratio of the polymer foam is 50 times, preferably 33 times.

According to the production method of the present invention, a closed-cell cellular polymer foam is impregnated with a non-aqueous electrolytic liquid (which comprises an electrolyte and a non-aqueous solvent), thereby infiltrating the electrolyte and the non-aqueous solvent in the polymer foam, thus obtaining a hybrid polymeric electrolyte having high ionic conductivity, which comprises the polymer foam, the electrolyte and the non-aqueous solvent. In this connection, it should be noted that the above-obtained hybrid polymeric electrolyte can be further impregnated with an electrolyte and a non-aqueous solvent, which may be the same or different from the electrolyte and the non-aqueous solvent retained in the hybrid polymeric electrolyte, so that addition and/or replacement of the electrolyte and/or the non-aqueous solvent thereof is performed. It is necessary that the non-aqueous solvent be incapable of dissolving the polymer, and the non-aqueous solvent is appropriately selected depending on the type of the polymer. As a non-aqueous electrolytic liquid, in addition to the above-mentioned solution of the electrolyte in a non-aqueous solvent, a liquid electrolyte can be mentioned.

It is preferred that electrochemically stable materials be used for obtaining the hybrid polymeric electrolyte of the present invention which is substantially insusceptive to oxidation and reduction at an electric potential in the range of from 1 to 3 V as measured relative to a reference electrode of metallic lithium. The electrochemical stability can be evaluated by a cyclic voltammetry method. Illustratively, one side of a hybrid polymeric electrolyte is covered with an electrochemically inert electrode (such as a stainless sheet) as the working electrode, and the halves of the other side of the sheet are, respectively, covered with 2 metallic lithium sheets as the counter electrode and the reference electrode, respectively, to thereby obtain an electrochemical cell. With respect to the working electrode, the potential sweep is conducted, and changes in the current due to oxidation or reduction are examined. When the measured current is lower than a certain current value which is obtained by doubling the background current due to oxidation or reduction as observed in the interface of the electric double layer (that is, lower than a certain current value which is obtained by doubling the current showing no peak due to oxidation or reduction), the electric potential corresponding to such a measured current is considered as representing an electrochemically stable condition. An electric potential as measured relative to a reference electrode of an electrode other than metallic lithium can be converted to the electric potential as measured relative to a reference electrode of metallic lithium. It is preferred that the hybrid polymeric electrolyte of the present invention be substantially insusceptive to oxidation and reduction at an electric potential in the range of from 1 to 3 V as measured relative to a reference electrode of metallic lithium, that is, be electrochemically stable. It is more preferred that the hybrid polymeric electrolyte be substantially insusceptive to oxidation and reduction at an electric potential in the range of from 0.7 to 4.0 V as measured relative to a reference electrode of metallic lithium. When the lower limit of the electric potential range within which the hybrid polymeric electrolyte is electrochemically stable is 1 V or more as measured relative to a reference electrode of metallic lithium, the hybrid polymeric electrolyte is susceptive to reduction, and when the upper limit of the electric potential range within which the hybrid polymeric electrolyte is electrochemically stable is 3 V or less as measured relative to a reference electrode of metallic lithium, the hybrid polymeric electrolyte is susceptive to oxidation.

As mentioned above, it is preferred that the hybrid polymeric electrolyte be electrochemically stable. For achieving such a property, it is preferred that all of the components of the hybrid polymeric electrolyte, such as a polymer, an electrolyte and a solvent therefor, be electrochemically stable. However, a hybrid polymeric electrolyte produced from materials containing electrochemically unstable material(s) may also be electrochemically stable.

The polymeric materials, the electrolytes and the solvent thereof will be described below in more detail.

The polymeric materials used in the present invention have a property such that an electrolytic liquid together with the polymeric material form a solid solution. Examples of such materials include materials used for obtaining conventional polymeric electrolytes. For example, materials described in the publication "Polymer Electrolyte Reviews 1 (1987) (edited by J. R. MacCallum, C. A. Vincent, Elsevier Applied Science Publishers Ltd., U.S.A.)" and "Solid Polymer Electrolytes (1991) (Fiona M. Gray, VCH Publishers, Inc., U.S.A.)" can be mentioned. Examples of such polymeric materials include alkylene ether polymers, such as poly(ethylene oxide), poly(propylene oxide) and an ethylene oxide/propylene oxide copolymer; poly(alkylene thioether); nitrile polymers, such as polyacrylonitrile and an acrylonitrile/styrene copolymer; vinylidene fluoride polymers, such as poly(vinylidene fluoride), a vinylidene fluoride/hexafluoropropylene copolymer, a perfluorovinyl ether/vinylidene fluoride copolymer, a tetrafluoroethylene/ vinylidene fluoride copolymer, a hexafluoropropylene oxide/vinylidene fluoride copolymer, a hexafluoropropylene oxide/tetrafluoroethylene/vinylidene fluoride copolymer, a hexafluoropropylene/tetrafluoroethylene/vinylidene fluoride copolymer and a fluoroethylene/vinylidene fluoride copolymer; polyphosphazene; a polydimethylsiloxane derivative; an aliphatic polyester; an aliphatic polycarbonate; poly (sulfoethyl methacrylate) and a salt thereof; carboxybutanoxylethylmethacrylate and a salt thereof; and commercially available resins, such as Nafion (tradename of a resin manufactured and sold by Du Pont, U.S.A.) and Flemion (tradename of a resin manufactured and sold by Asahi Glass Co., Ltd., Japan). Among these polymers, preferred are electrochemically stable polymers as explained above, such as polymers containing no ionic groups nor migrating hydrogens. Among the above-mentioned polymeric materials, vinylidene fluoride polymers, such as poly(vinylidene fluoride) and copolymers comprising vinylidene fluoride units are especially preferred, since they are electrochemically stable, and when such polymers are used as materials for closed-cell cellular polymer foam which is to be used for the production of the hybrid polymeric electrolyte of the present invention, the hybrid polymeric electrolyte exhibits high ionic conductivity.

A polymer containing ionic groups may have high hygroscopicity, depending on the type of the polymer. When such a polymer is used as a material, the electrochemical stability of the hybrid polymeric electrolyte becomes low, since the water content of the hybrid polymeric electrolyte becomes large. Also, when a polymer containing ionic groups is used as a material, the ionic conductivity of the hybrid polymeric electrolyte may become low depending on the type of the polymer, because it is difficult to impregnate such a polymer with the non-aqueous electrolytic liquid.

When the polymer has a group containing a migrating hydrogen (protonic hydrogen) (such as a carboxylic acid group, a sulfonic acid group, a hydroxyl group and an N-H group), the obtained hybrid polymeric electrolyte is likely to suffer a reduction reaction or a side reaction accompanying the reduction reaction, so that the electrochemical stability of the hybrid polymeric electrolyte becomes low.

It is preferred that the polymer used in the present invention have a molecular weight of from 1,000 to 10,000, 000. When the polymer is a vinylidene fluoride polymer, it is preferred that such a polymer have a molecular weight of from 5,000 to 2,000,000, more preferably from 10,000 to 1,000,000.

From the above-mentioned polymers, a polymer foam can be produced by any of conventional methods. An example of such methods is a method comprising incorporating a foaming agent into a molded polymer under atmospheric or superatmospheric pressure, and heating the polymer under atmospheric or reduced pressure, so as to perform a foaming of the polymer by a gas generated by vaporization or decomposition of the foaming agent. Alternatively, a polymer foam may be produced by a method in which a mixture of a polymer and a foaming agent is molded, and then the resultant molded product is foamed by heating. The temperature, time and pressure for the above foaming operation may vary depending on the types of the polymer and the foaming agent, the desired volume ratio of closed cells of a polymer foam to be produced, the desired configuration and dispersion morphology of closed cells, or the like. However, the foaming operation is generally conducted at a temperature which is around the melting temperature of the polymer and which enables the foaming agent to produce a gas. The heating in the foaming operation can be done, for example, by a method comprising contacting a polymer containing a foaming agent with a heat roll, a method comprising heating a polymer containing a foaming agent with convection heat or radiant heat by means of a heating oven, such as an electric resistance heating oven or an infrared heating oven, and a method comprising heating a polymer containing a foaming agent by the irradiation of microwave, radiofrequency energy or laser beam. Alternatively, a polymer foam can b e obtained by incorporating a supercritical liquid, such as a supercritical liquid of carbon dioxide or the like as a foaming agent into a polymer, and placing the polymer (having a supercritical liquid incorporated therein) under atmospheric pressure.

For example, when it is desired to produce a polymer foam from a vinylidene fluoride polymer, the method disclosed in Examined Japanese Patent Application Publication No. 4-57704 can be used. Specifically, a polymer foam can be produced by a method comprising: subjecting a meltmolded product of a polymer to 1) irradiation with radiant energy, such as electron beams, γ-rays or the like, 2) radical crosslinking, or 3) treatment with an alkali, to obtain a polymer having a crosslinked structure; impregnating the obtained polymer with a foaming agent, such as a halogen compound or a hydrocarbon; and foaming the polymer by heating or the like. Examples of foaming agents include flon 134a, a supercritical liquid of carbon dioxide, and toluene. When the foaming agent is flon 134a or a supercritical liquid of carbon dioxide, the impregnation of the polymer with the foaming agent is conducted under pressure. The above-mentioned irradiation with electron beams, irradiation with γ-rays, radical crosslinking or treatment with an alkali may be carried out after the foaming operation.

When the hybrid polymeric electrolyte of the present invention is used as a separator or the like for a battery, it is preferred to use a polymer having a crosslinked structure since the occurrence of a short circuiting at high temperatures can be prevented. In the present invention, it is preferred that the polymer used have intermolecular crosslinkages between polymer molecules, and it is preferred that the polymer contain no crosslinkable monomer unit.

When a crosslinkable monomer is incorporated in a vinyliden fluorine polymer and the crosslinking of the vinyliden fluoride polymer is carried out with the polymerization of the crosslinkable monomer, a residual crosslinkable monomer in the polymer undergo a reductive polymerization, an electrolytic oxidation or an electrolytic reductive decomposition at the interface between the polymer and electrodes, and reaction products formed by the above-mentioned reactions occurring at the interface between the polymer and electrodes undergo further side-reactions. As a result, various disadvantages are likely to be caused, such as a lowering of current efficiency, and the destruction of the structure of the interface between the polymer and electrodes, thereby lowering the performance of the battery. It is possible to remove the residual monomers from the polymer; however such a removal operation is cumbersome. Further, depending on the type of the crosslinkable monomer unit remaining in the polymer used for producing the hybrid polymeric electrolyte, it is likely that the obtained hybrid polymeric electrolyte suffers electrochemical side-reactions, or suffers hydrolysis even in the presence of a trace amount of water.

Examples of methods for crosslinking the polymer used in the hybrid polymeric electrolyte of the present invention include a method in which a crosslinked structure is formed by the irradiation of a radiation energy, such as electron beams, γ-rays, X-rays, ultra-violet light, infrared light or the like; a method in which a crosslinked structure is formed by a radical reaction initiated by a radical initiator incorporated in the polymer; and a method in which a crosslinked structure is formed by a reaction between double bonds which are formed by an alkali treatment (for elimination of HF).

Among these methods, electron beam irradiation is preferred from the viewpoint of commercial scale production of the hybrid polymeric electrolyte and ease in process control. In conducting electron beam irradiation, when the irradiation dose is too small, the desired effects of the crosslinking cannot be achieved. On the other hand, when the irradiation dose is too large, a decomposition of the polymer is likely to occur, and the use of too large an irradiation dose is also disadvantageous from the viewpoint of productivity. Therefore, it is preferred that the irradiation dose be from 5 to 100 Mrads. In the case of the irradiation with γ-ray, the irradiation intensity and irradiation time may be appropriately selected so that the irradiation dose becomes a value equivalent to the above-mentioned dose of electron beam irradiation.

The formation of a crosslinked structure is confirmed by the measurement of the solubility of the polymer in an organic solvent capable of dissolving a linear polymer (linear polymer-dissolvable organic solvent). Specifically, since a polymer containing a crosslinked structure has a segment which is insoluble in a linear polymer-dissolvable organic solvent, the presence of such a segment indicates the presence of a crosslinked structure. There is no particular limitation with respect to the linear polymer-dissolvable organic solvent, and an appropriate solvent is selected depending on the type of the polymer. When the polymer is a hexafluoropropylene/vinylidene fluoride copolymer, N-methylpyrolidone, chloroform, dichloromethane, dichloroethane, acetone, tetrahydrofuran, dimethylformamide, dimethylsulfoxide, dimethylacetamide or the like can be preferably used as the linear polymer-dissolvable organic solvent.

The polymer matrix of the hybrid polymeric electrolyte of the present invention contains a non-cross-linked polymer segment in addition to the above-mentioned crosslinked polymer segment. A crosslinked polymer segment is distinguishable from a non-cross linked polymer segment since a crosslinked polymer segment is insoluble in the above-mentioned solvent, whereas a non-crosslinked polymer is soluble in the above-mentioned solvent. For example, a vinylidene fluoride polymer is immersed in N-methylpyrroridone as a solvent, and allowed to stand at 100° C. for 2 hours to thereby dissolve the non-crosslinked polymer segment. The undissolved solids comprised of the crosslinked polymer segment is taken out of the solvent, washed with acetone and methanol, dried and weighed. The weight ratio of the crosslinked polymer segment defined below can be calculated from the weight after the drying. In the polymer matrix of the hybrid polymeric electrolyte of the present invention, it is preferred that the weight ratio of the crosslinked polymer segment defined by the formula (weight of a crosslinked polymer segment)/(total weight of a crosslinked polymer segment and a non-crosslinked polymer segment) be from 0.2 to 0.8. When the above weight ratio is less than 0.2, the effect of a crosslinked polymer segment becomes small. The non-crosslinked polymer segment, which is contained in the polymer matrix of the hybrid polymeric electrolyte together with a crosslinked polymer segment, has the effect to increase the adhesion between the hybrid polymeric electrolyte and an electrode in the fabrication of a battery as described below. By this effect, the mechanical strength and performance of a battery are improved. When the weight ratio of the crosslinked polymer segment to the total weight of the crosslinked polymer segment and the non-crosslinked polymer segment is more than 0.8, the above-mentioned effect of the non-crosslinked polymer segment is decreased, so that the performance of a battery is not high.

The hybrid polymeric electrolyte of the present invention may be provided in various forms, such as a sheet, a sphere and a fiber.

When the hybrid polymeric electrolyte of the present invention is provided in the form of a sheet and used, for example, as a separator for a battery, there is no particular limitation with respect to the film thickness of the separator, and the suitable film thickness varies depending on the type of the battery. However, in general, it is preferred that the film thickness of the separator be from about 5 to about 500 μm. When the film thickness is less than 5 μm, the mechanical strength becomes low and short circuiting between electrodes is likely to occur when a battery containing such a separator is operated. When the film thickness is more than 500 μm, not only is the effective electrical resistance of the separator excessively high, but also the energy density per volume of the battery becomes low.

In the step of impregnating the polymer foam sheet with a non-aqueous electrolytic liquid, depending on the types of the polymer foam sheet and the electrolytic liquid, it is possible that a problem arises such that the polymer foam sheet markedly swells or shrinks upon the impregnation with the non-aqueous electrolytic liquid. This phenomenon not only makes it difficult to set the feeding speed of polymer foam sheets for a continuous process of the impregnation of polymer foam sheets with a non-aqueous electrolytic liquid, but also causes a problem such that, when the impregnation of the polymer foam sheet with a non-aqueous electrolytic liquid is performed after the battery has been assembled using the polymer foam sheet, the hybrid polymeric electrolyte suffers cracking due to a large stress produced by an excessive swelling or shrinkage of the hybrid polymeric electrolyte. The above-mentioned phenomenon also causes a problem such that, after a polymer foam sheet undergoes excessive swelling by the impregnation with an electrolytic liquid, when the electrolytic liquid evaporates or leaks out from the obtained hybrid polymeric electrolyte during the use of a battery containing the hybrid polymeric electrolyte, a short circuiting may occur due to a excessive shrinkage of the hybrid polymeric electrolyte.

The above mentioned problems can be solved by irradiating the polymer foam sheet with electron beams and/or stretching the polymer foam sheet, so as to cause the polymer foam sheet to have at least one construction selected from a construction in which the polymer foam sheet comprises a crosslinked polymer segment having a crosslinked structure formed by electron beam irradiation, and a construction in which the polymer foam sheet is in a stretched form. When the polymer foam sheet has the above-mentioned at least one construction, it does not undergo excessive swelling or shrinkage upon the impregnation of it with an electrolytic liquid.

When a polymer foam sheet used for the production of the hybrid polymeric electrolyte has a large expansion ratio, the polymer foam sheet is likely to undergo shrinkage by the impregnation with an electrolytic liquid. This shrinkage can be suppressed by electron beam irradiation. On the other hand, when the polymer foam sheet has a small expansion ratio, the polymer foam sheet is likely to undergo swelling by the impregnation with a non-aqueous electrolytic liquid. However, by appropriately choosing the expansion ratio, the method for stretching a polymer foam sheet, the stretching ratio, and the dose of electron beam irradiation, it is possible to suppress swelling and shrinkage of the polymer foam sheet upon the impregnation with a non-aqueous electrolytic liquid.

With respect to the method for stretching the polymer foam, there is no particular limitation, and various known methods, such as a uniaxial stretching method, a successive biaxial stretching method and a simultaneous biaxial stretching method can be used. These methods are described, for example, in "Kagaku Binran, Ouyo-kagaku-hen I (purosesu) [Chemistry Handbook, Applied Chemistry I (Process)]" (P. 643, 1986, edited by Chemical Society of Japan and published by Maruzen Co., Ltd.)

In general, a stretched polymer is likely to change its size toward recovering its original size upon being softened by the impregnation with an electrolytic liquid. By utilizing this property, a dimensional change of the polymer by swelling can be minimized. Specifically, a dimensional increase of the polymer by swelling upon the impregnation with an electrolytic liquid can be cancelled by performing a biaxial stretching of a polymer in an appropriate stretching ratio prior to the impregnation. Further, when a uniaxially stretched polymer is impregnated with an electrolytic liquid, the polymer is likely to shrink in the direction of stretching and swell in a direction perpendicular to the direction of stretching. Thus, a dimensional change of a polymer by swelling upon the impregnation with an electrolytic liquid can be suppressed by stretching the polymer uniaxially in an appropriate stretching ratio and in an appropriate direction prior to the impregnation.

The above-mentioned electron beam irradiation and stretching treatment can be employed individually or in combination. The dose of electron beam irradiation and the stretching ratio can be determined according to the amount of an electrolytic liquid which is impregnated in the polymer foam sheet.

With respect to the surface area of the polymer foam sheet obtained by electron beam irradiation and/or stretching treatment, when the polymer foam sheet has an ionic conductivity which is sufficient for use as an electrolyte for a battery (that is, an ionic conductivity of at least $1\times10^{-4}$ S/cm) after impregnation with a non-aqueous electrolytic liquid, it is preferred that the surface area of the impregnated electrolyte be 50 to 200%, more preferably from 70 to 170%, still more preferably from 90 to 150%, based on the surface area prior to the impregnation with the non-aqueous electrolytic liquid. By using the methods described above, a hybrid polymeric electrolyte in a sheet form can be produced while suppressing a dimensional change upon the impregnation with a non-aqueous electrolytic liquid.

The non-aqueous electrolytic liquid used in the present invention is generally a solution of an electrolyte in a non-aqueous solvent. However, when the electrolyte itself has flowability or is a liquid, the electrolyte can be used as a non-aqueous electrolytic liquid as such.

In the present invention, the electrolyte used in the non-aqueous electrolytic liquid may be either a salt of an inorganic acid or a salt of an organic acid. Examples of salts include salts of inorganic acids, such as tetrafluoroboric acid, perchloric acid, hexafluorophosphoric acid, nitric acid, sulfuric acid, phosphoric acid, hydrofluoric acid, chloric acid, bromic acid and iodic acid; and salts of organic acids, such as trifluoromethanesulfonic acid, fluoropropylsulfonic acid, bis(trifluoromethanesulfonyl)imide acid, acetic acid, trifluoroacetic acid and propionic acid. Further, the above-mentioned salts may be used in the form of a mixture thereof as an electrolyte. Examples of electrolytic cations of the above-mentioned salts include an alkali metal, an alkaline earth metal, a transition metal, a rare earth metal and an ammonium ion. The above-mentioned cations may be used individually or in combination. The types of cations used may vary depending on the objective of the use of the hybrid polymeric electrolyte. For example, when the hybrid polymeric electrolyte of the present invention is used in a lithium battery, it is preferred to use a lithium salt as the electrolyte. Examples of lithium salts include LiCl, LiBr, LiSCN, $LiClO_4$, $LiNO_3$, $Li(C_6H_5)_4B$, $Li(C_5H_{11}-HC=CH_2)_4B$, $Li(C_4H_9-HC=CH_2)_4B$, $Li(C_6H_5-(CH_2)_3-HC=CH_2)_4B$, $Li_2B_{10}Cl_{10}$, $Li_2B_{12}Cl_{12}$, $Li_2B_{12}H_{12}$, $LiCF_3SO_3$, $LiC_4F_9SO_3$, $LiC_6F_{13}SO_3$, $LiC_8F_{17}SO_3$, $LiCF_3CO_2$, $LiN(CF_3CO_2)_2$, $LiN(CF_3SO_2)_2$, $LiN(CH_3SO_2)_2$, $LiAsF_6$, $LiBF_4$, $LiPF_6$, $LiOOC(CF_2)_3COOLi$ and $LiSO_3(CF_2)_3SO_3Li$. When the hybrid polymeric electrolyte of the present invention is used in a lithium secondary battery, in which the potential difference between the positive electrode and the negative electrode is large and hence a wide range of electrochemical window is utilized, it is preferred that the electrolyte be an electrochemically stable lithium salt. Examples of such lithium salts include a lithium salt of fluorinated alkylsulfonic acid, such as $LiCF_3SO_3$ or $LiC_4F_9SO_3$; a lithium salt of fluorinated sulfonimide, such as $LiN(CF_3SO_2)_2$; $LiBF_4$; $LiPF_6$; $LiClO_4$; and $LiAsF_6$.

Examples of solvents used in the electrolytic liquid for impregnating the polymer foam include low molecular weight organic compounds, such as cyclic carbonate compounds (e.g., ethylene carbonate, propylene carbonate and butylene carbonate), chain carbonate compounds (e.g., dimethyl carbonate, diethyl carbonate and methyl ethyl carbonate), ether compounds (e.g., tetrahydrofuran and methyltetrahydrofuran), ester compounds (e.g., γ-butyrolactone, propiolactone and methyl acetate), nitrile compounds (e.g., acetonitrile and propionitrile); and oligoethylene oxides, such as diglyme and tetraglyme; and derivatives thereof. Among the above-mentioned compounds, carbonate compounds and ester compounds are preferred for a lithium battery due to their excellent electrochemical stability. Further, in the present invention, a solution of a polymer in the above-mentioned solvents can also be used as a solvent for an electrolyte. Examples of such polymers include aliphatic polyethers, such as polyethylene oxide and polypropylene oxide; fluorinated polymers, such as polyvinylidene fluoride and a vinylidene fluoride/hexafluoropropylene copolymer; polyacrylonitrile; aliphatic polyesters; and aliphatic polycarbonates. The hybrid polymeric electrolyte of the present invention can be advantageously produced by impregnating a closed-cell cellular polymer foam with a solution of the above-mentioned electrolytes in the above-mentioned solvents. Such a solution may further contain other solvents for an electrolyte. Alternatively, as mentioned above, a liquid electrolyte as such may be used as an electrolytic liquid without using a solvent.

The hybrid polymeric electrolyte of the present invention can be produced, for example, by immersing, at an appropriate temperature, a polymer foam in a solution obtained by dissolving an electrolyte in a solvent therefor, thereby impregnating the polymer foam with the solution of the electrolyte. The above-mentioned method is preferred from the viewpoint of ease in operation.

In the present invention, as mentioned above, by employing a polymer foam having a crosslinked polymer segment, a hybrid polymeric electrolyte having high mechanical strength and excellent heat stability can be obtained. In the present invention, it is not requisite for the polymer foam to have a crosslinked structure. However, when the polymer foam has a crosslinked structure, the contents of the electrolyte and the solvent therefor in the hybrid polymeric electrolyte can be selected from broad ranges. The use of a polymer foam having a crosslinked structure is advantageous especially when it is intended to obtain a hybrid polymeric electrolyte having high contents of the electrolyte and the solvent therefor, because it becomes possible to obtain a hybrid polymeric electrolyte which can remain in a solid form even when it has the electrolyte and the solvent therefor in high contents.

The impregnation temperature may vary depending on the combination of an electrolyte and a solvent therefor, the impregnation time and the like. However, when the impregnation temperature is as low as around room temperature, even if the impregnation is conducted for a prolonged period of time, the impregnation of the polymer matrix with a satisfactory amount of the electrolytic liquid cannot be performed. Therefore, the resultant hybrid polymeric electrolyte has only a low ionic conductivity. On the other hand, when the impregnation temperature as high as around the melting temperature of the polymer of the polymer foam, the polymer foam is either distorted or dissolved in the electrolytic liquid. Therefore, the impregnation is conducted at a temperature at which the electrolytic liquid can satisfactorily swell the polymer foam without distorting or dissolving the polymer foam. Specifically, the impregnation temperature is generally from 35° C. to 200° C., preferably from 50° C. to 180° C., more preferably from 60° C. to 150° C.

The impregnation of a polymer foam with a non-aqueous electrolytic liquid can also be conducted by immersing the polymer foam in a non-aqueous electrolytic liquid which contains a swelling agent, to thereby efficiently and effectively impregnating the polymer foam with the swelling agent-containing electrolytic liquid. By this method, the impregnation can be conducted at a relatively low temperature and the impregnation time can be shortened. In this method, the impregnation treatment conditions, such as the composition of the electrolytic liquid, the impregnation temperature and the impregnation time may be appropriately selected so that the polymer foam is not substantially dissolved during the impregnation treatment.

Further, when a polymer foam is impregnated with a non-aqueous electrolytic liquid which contains a swelling agent as mentioned above, at least a part of the swelling agent can be removed from the resultant hybrid polymeric electrolyte, for example, by the following methods. When the swelling agent used has a low boiling point as compared to that of the solvent for the electrolyte, the swelling agent can be selectively removed from the hybrid polymeric electrolyte by subjecting the hybrid polymeric electrolyte to at least one treatment selected from the group consisting of reduced pressure treatment and heat treatment utilizing the difference in boiling point between the swelling agent and the solvent for the electrolyte. The amount of the swelling agent to be removed may be appropriately selected by controlling the treatment conditions (e.g., the degree of reduced pressure, the temperature and the time). When the swelling agent has a boiling point close to that of the solvent for the electrolyte, not only the swelling agent but also the solvent is removed from the hybrid polymeric electrolyte by the above-mentioned at least one treatment. In this instance, the resultant hybrid polymeric electrolyte having a low content of the solvent for the electrolyte may be further impregnated with a solvent for the electrolyte so as to supplement the solvent in the hybrid polymeric electrolyte. Alternatively, after a polymer foam is impregnated with a non-aqueous electrolytic liquid which contains a swelling agent, the resultant hybrid polymeric electrolyte may be further impregnated with a solution of an electrolyte in a non-aqueous solvent, which solution contains no swelling agent, to thereby replace at least a part of the swelling agent by the electrolytic solution containing no swelling agent. In this method, the amount of the swelling agent remaining in the hybrid polymeric electrolyte can be controlled by changing the amount of the electrolytic solution or the non-aqueous solvent which is used for the replacement, and the temperature and time for the above replacement operation. For largely reducing the swelling agent content of the hybrid polymeric electrolyte, it is preferred to repeat the above-mentioned replacement operation several times.

It is preferred that the above-mentioned swelling agent be composed of compounds which are insusceptible to electrochemical reactions. Such an electrochemically inert swelling agent may be left in the hybrid polymeric electrolyte, and in such a case, the swelling agent serves as a solvent for the electrolyte. When a swelling agent comprising electrochemically reactive compounds is used, such a swelling agent is removed from the hybrid polymeric electrolyte by the above-mentioned methods, or by extraction, distillation or the like. The swelling agent content of the hybrid polymeric electrolyte of the present invention is preferably 5% or less by weight, based on the weight of the hybrid polymeric electrolyte.

Explanation is made below with respect to a specific example of the above-mentioned impregnation method using a swelling agent, in which example a polymer foam of a vinylidene fluoride polymer, such as polyvinylidene fluoride or a vinlidene fluoride/hexafluoropropylene copolymer, is impregnated with a non-aqueous electrolytic liquid which contains a swelling agent. Examples of swelling agents include ketone compounds, such as acetone and methylethyl ketone; cyclic compounds, such as tetrahydorofuran and dioxane; and ester compounds, such as ethyl acetate and butyl acetate. Such a swelling agent is mixed with a solution of an electrolyte in a non-aqueous solvent to prepare a swelling agent-containing electrolytic liquid, and then a polymer foam is impregnated with the obtained electrolytic liquid. Alternatively, the polymer foam may be first impregnated with a swelling agent and then impregnated with a solution of an electrolyte in a non-aqueous solvent. The impregnation of the polymer foam with the swelling agent or with the swelling agent-containing electrolytic liquid is conducted at a temperature of from room temperature to 100° C. When the vapor pressure of the swelling agent and/or the solvent for the electrolyte is relatively high at the impregnation temperature, the impregnation is conducted in a sealed vessel under atmospheric pressure or under super-atmospheric pressure. When a solvent having a high boiling point, such as cyclic carbonates (e.g., ethylene carbonate and propylene carbonate) and cyclic esters (e.g., γ-butyrolactone), is used as the solvent for the electrolyte, a swelling agent having a low boiling point can be removed by the above-mentioned method. The hybrid polymeric electrolyte of the present invention can be produced by the above-mentioned methods. However, methods for producing the hybrid polymeric electrolyte are not limited to these methods.

The hybrid polymeric electrolyte of the present invention has a high ionic conductivity and various excellent properties, such as flexibility, processability, mechanical strength and electrochemical stability. Therefore, this hybrid polymeric electrolyte is applicable to various types of electrochemical devices, such as a battery (e.g., a lithium battery, a lithium secondary battery, a lithium ion secondary battery, an air battery and a photochemical battery), an electrical double layer capacitor, an electrochemical sensor and an electrochromic display device.

In the above-mentioned electrochemical devices, at least two electrodes are disposed through the hybrid polymeric electrolyte provided therebetween.

A battery as a representative example of electrochemical devices employing the hybrid polymeric electrolyte of the present invention will be described hereinbelow. In a battery employing the hybrid polymeric electrolyte of the present invention has a structure such that a positive electrode and a negative electrode are disposed through the hybrid polymeric electrolyte of the present invention provided therebetween.

For example, in the case of a lithium battery, it is preferred that a lithium salt be contained in the hybrid polymeric electrolyte, and therefore, it is preferred that a lithium salt be used as an electrolyte. When a lithium salt is contained in the hybrid polymeric electrolyte, it is preferred that a substance capable of occluding and releasing lithium be used as a material for the positive electrode and the negative electrode. As the positive electrode material, a material having a higher electric potential than that of the negative electrode material is employed. Examples of such positive electrode materials include oxides, such as $Li_{1-x}CoO_2$, $Li_{1-x}NiO_2$, $Li_{1-x}Mn_2O_4$ and $Li_{1-x}MO_2$ (wherein 0<x<1, and M represents a mixture of Co, Ni, Mn and Fe); $Li_{2-y}Mn_2O_4$ (wherein 0<y<2), crystalline $Li_{1-x}V_2O_5$, amorphous $Li_{2-y}V_2O_5$ (wherein 0<y<2) and $Li_{1.2-x'}Nb_2O_5$ (wherein 0<x'<1.2); metal chalcogenides, such as $Li_{1-x}TiS_2$, $Li_{1-x}MoS_2$ and $Li_{3-z}NbSe_3$ (wherein 0<z<3); and organic compounds, such as polypyrrole, polythiophene, polyaniline, a polyacene derivative, polyacetylene, polythienylene vinylene, polyallylene vinylene, a dithiol derivative, and a disulfide derivative.

As the negative electrode material, a material having a lower electric potential than that of the positive electrode material is employed. Examples of such negative electrode materials include metallic lithium-containing materials, such as metallic lithium, an aluminum-lithium alloy and a magnesium-aluminumlithium alloy; intermetallic compounds, such as AlSb, $Mg_2Ge$ and $NiSi_2$; carbonaceous materials, such as a graphite, a coke and a low temperature-calcined polymer; lithium solid solutions of metal oxides, such as an SnM oxide (wherein M represents Si, Ge or Pb), a complex oxide of $Si_{1-y}M'_yO_z$ (wherein M' represents W, Sn, Pb, B or the like), titanium oxide and iron oxide; and ceramics, such as nitrides, e.g., $Li_7MnN_4$, $Li_3FeN_2$, $Li_{3-x}Co_xN$, $Li_{3-x}NiN$, $Li_{3-x}Cu_xN$, $Li_3BN_2$, $Li_3AlN_2$ and $Li_3SiN_3$. It should be noted that when metallic lithium formed on the negative electrode by the reduction of lithium ions on the negative electrode is used as a negative electrode material, the type of the material for the negative electrode is not particularly limited as long as it is electrically conductive.

The positive and negative electrodes used in the battery of the present invention are produced by molding the above-mentioned electrode materials into a predetermined configuration. The electrodes may be either in the form of a continuous solid or in the form of a particulate electrode material dispersed in a binder. Examples of methods for forming a continuous solid include electrolysis, vacuum deposition, sputtering, CVD, melt processing, sintering, and powder compression molding. In the powder compressing molding method, an electrode is produced by molding a mixture of a particulate electrode material and a binder. Examples of binders include not only the above-mentioned vinylidene fluoride polymers used as materials for a closed-cell cellular polymer foam, but also nonfoamed polymers, such as a styrene-butadiene latex and Teflon latex, and metals. A polymerizable monomer and a crosslinking agent may be added to the binder, and the resultant mixture may be subjected to molding, followed by polymerization and crosslinking. In addition, a particulate form of the hybrid polymeric electrolyte of the present invention may also be used as a binder. For the purpose of improving the strength of such a binder or modifying the properties of such a binder, the binder may be irradiated with radiant energy, such as electron beams, γ-rays, ultraviolet rays and infrared rays. For effecting ion transportation between the positive and negative electrodes, current collectors made of a material having low electrical resistance may be provided on the positive and negative electrodes. In producing an electrode according to the above-mentioned methods, the current collector is used as a substrate for the electrode. A battery can be produced by preparing a laminate structure composed of a positive electrode/the hybrid polymeric electrolyte of the present invention/a negative electrode. Alternatively, a battery can also be produced by first preparing a laminate structure composed of a positive electrode/a closed-cell cellular polymer foam before impregnation with a non-aqueous electrolytic liquid/a negative electrode, and then impregnating the laminate structure with a non-aqueous electrolytic liquid.

In general, in conventional batteries wherein an electrolytic liquid is simply used or a polymer is simply impregnated with an electrolytic liquid, the electrode is used in such a form as retains electrolytic liquid therein. In this case, by a long-term storage or under some storage conditions, a non-uniformity and a decrease in the electrolytic liquid content in the electrode are likely to take place, leading to a decrease in the ion transportation between the electrodes, so that a lowering of the performance of the battery occurs. This problem is especially serious in secondary batteries which need to be used for a long period of time, since the life of secondary batteries becomes shortened. In addition to the lowering of the battery performance, the danger that an oozing-out of an electrolytic liquid from the electrodes causes a leakage of the electrolytic liquid to the outside of the battery has been a serious problem.

In order to solve the above-mentioned problems, according to another aspect of the present invention, there is provided an electrode comprising a particulate electrode material and a binder comprising a closed-cell cellular polymer foam. Further, by impregnating the cellular polymer foam of the electrode with a non-aqueous electrolytic liquid, an electrode having the high ability to retain an electrolytic liquid therein can be obtained. Specific examples of methods for producing such an electrode of the present invention include a method comprising molding a mixture of a particulate electrode material and a closed-cell cellular polymer foam or a pulverized product of a closed-cell cellular polymer foam, thereby obtaining a molded material, and a method comprising molding a mixture of a particulate electrode material and a binder resin prior to obtain a molded product, and foaming the binder resin in the molded product. The obtained electrode is impregnated with a non-aqueous electrolytic liquid to obtain a swollen product for use as an electrode for a battery.

The electrode of the present invention comprises a particulate electrode material and a binder resin comprising a closed-cell cellular polymer foam. The electrode of the present invention has a high ability to retain an electrolytic liquid therein and to prevent leakage of an electrolytic liquid, as compared to conventional electrodes. By impregnating the electrode of the present invention with an electrolytic liquid to obtain an electrode, and using such an electrode for a battery, a battery having excellent properties can be obtained. The closed cells in the binder of the electrode of the present invention which is used for a battery are filled with an electrolytic liquid. In the electrode of the present invention, unlike the conventional electrodes having a through-hole structure, the electrolytic liquid is sealed within the closed-cell structure, so that leakage of the electrolytic liquid from the electrode is less likely to occur. Further, it is presumed that the closed-cell structure also functions as a buffer structure for controlling the amount of the electrolytic liquid in the continuous solid polymer matrix.

In the electrode of the present invention, it is preferred that the volume percentage of closed cells contained in the binder which comprises a closed-cell cellular polymer foam, be from 5 to 90%, based on the entire volume of the binder (prior to the impregnation with an electrolytic liquid). The electrode comprising such a binder is impregnated with an electrolytic liquid so that the electrode can be used as an electrode for a battery. When the volume percentage of the closed cells contained in the binder is less than 5%, based on the entire volume of the binder (prior to the impregnation with an electrolytic liquid), the effect of the electrode of the present invention is not fully attained. When the volume percentage of the closed cells contained in the binder is more than 90%, based on the entire volume of the binder (prior to the impregnation with an electrolytic liquid), it is likely that the electrode obtained using the binder has too large a thickness so that the energy density per unit volume of a battery becomes low, that the strength of the electrode after the impregnation with an electrolytic liquid becomes low, and that the electrical resistance becomes high. In the present invention, the volume percentage of the closed cells in the binder is more preferably 85% or less, most preferably 80% or less, on the above-mentioned basis. Closed cells in the binder are enclosed by a resin or by a mixture of a resin and a particulate electrode material. As the closed-cell cellular polymer foam used in the electrode of the present invention, a polymer foam which has through-holes in addition to the closed cells can also be used. When such a polymer foam is used, the volume percentage of the through-holes is not included in the volume percentage of the closed cells. It is preferred that the volume percentage of the particulate electrode material contained in the electrode of the present invention be 20 to 70%, based on the entire volume of the electrode.

The cross-section of each of closed cells contained in a closed-cell cellular polymer foam used in the electrode of the present invention may take various shapes, such as circular, elliptic and polygonal shapes. The preferable size of the closed cell may vary depending upon the objective of the use of the electrode. The closed cell generally has a size of from 0.1 to 100 $\mu$m, more preferably from 1 to 50 $\mu$m, in terms of the average value of the long axis and short axis of each closed cell.

When the binder (polymer foam) in the electrode is impregnated with an electrolytic liquid comprising an electrolyte and a solvent for the electrolyte, the electrolyte and the solvent are incorporated in the polymer, so that the binder is converted to an ion-conductive material comprising the polymer, the electrolyte and the solvent. Alternatively, an electrolyte and/or a solvent for the electrolyte may be first incorporated in the binder and then, the resultant binder may be impregnated with an additional electrolytic liquid to supplement and/or replace the original electrolyte and/or solvent. It is necessary that the solvent for an electrolyte do substantially not dissolve the polymer, and various combinations of polymers and solvents, which satisfy this requirement, can be used. When the electrode of the present invention is intended to be used for a lithium battery or a lithium ion battery, a solution of a lithium salt in a non-aqueous solvent is used as the electrolytic liquid. In this case, as polymer materials for the binder, those which are described above as being suitable materials for a closed-cell cellular polymer foam used in the hybrid polymeric electrolyte of the present invention are used.

The binder can be prepared according to the methods described above in connection with the preparation of a closed-cell cellular polymer foam. Examples of such methods include a method in which a foaming agent is incorporated into a molded polymer, and the resultant polymer is heated under atmospheric or reduced pressure, so that a foaming of the polymer is performed by a gas generated by vaporization or decomposition of the foaming agent; and a method in which a mixture of a polymer and a foaming agent is molded, and then the resultant molded product is foamed. During or after the molding, a polymerizable monomer or crosslinking agent may be blended with the polymer to effect a polymerization or crosslinking reaction of the monomer, or the polymer may be irradiated with electron beams, γ-ray or ultraviolet ray to effect a crosslinking reaction of the polymer. The above polymerization and crosslinking reactions increase the strength of the polymer foam produced.

Further, an electroconductive filler may be added to the binder in order to promote the transportation of electrons in an electrode active material. As the electroconductive filler, a carbonaceous material filler, such as carbon black, acetylene black or graphite, a metallic filler and an electroconductive ceramic filler can be used.

When the hybrid polymeric electrolyte of the present invention is used (in a battery) in the form of a laminate structure of electrode/hybrid polymeric electrolyte/ electrode, the hybrid polymeric electrolyte can serve as a separator. It is preferred that the polymer foam for such a use comprise a vinylidene fluoride polymer having a crosslinked structure.

In the case of a lithium battery, the battery can be obtained by preparing a laminate structure in which the hybrid polymeric electrolyte of the present invention is sandwiched between a positive electrode and a negative electrode. For example, units of a laminate structure of positive electrode/ hybrid polymeric electrolyte/negative electrode can be laminated on one another so as to have a sheet-like or roll-like structure. It is also possible to combine a plurality of batteries in a manner such that the electrodes of the individual batteries are connected in parallel or in series. In general, in the case of a battery comprising a solid electrolyte, the voltage can be increased by increasing the number of batteries which are connected in series. An ion conductor other than the hybrid polymeric electrolyte may be inserted between and brought into contact with the electrodes and the hybrid polymeric electrolyte, for the purpose of, e.g., achieving close interfacial contact and decreasing interfacial resistance. If desired, means for connecting electrical terminals to take or introduce electric current, devices for controlling electric current or voltage, and coatings for preventing moisture absorption of the above-mentioned battery unit and laminate structure and for protecting the battery unit and laminate structure, may be attached to the battery and laminate structure.

The hybrid polymeric electrolyte of the present invention has excellent properties, such as high ionic conductivity, excellent flexibility, excellent processability, high mechanical strength, and high electrochemical stability. Therefore, the hybrid polymeric electrolyte of the present invention can be advantageously used not only in a lithium battery and a lithium secondary battery, but also in various electrochemical devices, such as a photoelectrochemical battery, an electrochemical sensor and an electrical double layer capacitor.

BEST MODE FOR CARRYING OUT THE INVENTION

The present invention will be described in more detail with reference to Examples and Comparative Examples, which should not be construed as limiting the scope of the present invention.

In the Examples and Comparative Examples, the irradiation of electron beams was performed at room temperature, using Curetron EBC-200-AA2 (acceleration voltage: 200 kV, electron current: 20 mA) manufactured and sold by Nissin High Voltage Co., Ltd., Japan.

In the Examples and Comparative Examples, the measurement of volume percentage of liquid-phase domains of hybrid polymeric electrolyte and evaluation of oxidation-reduction stability of hybrid polymeric electrolyte were conducted by the following methods.

(i) Measurement of Volume Percentage of Liquid-phase Domains of Hybrid Polymeric Electrolyte A sheet of hybrid polymeric electrolyte was frozen with liquid nitrogen, and cut with a razor along three planes (X-Z plane, Y-Z plane and X-Y plane of the X, Y, Z coordinates wherein the X-Z plane and Y-Z plane are taken along a thicknesswise direction of the sheet) which are perpendicular to one another, to obtain a sample having first, second and third cross-sections corresponding, respectively, to the X-Z, Y-Z and X-Y planes. Each of the first, second and third cross-sections of the sample was examined by a reflecting optical microscope (Olympus BH-2 metallurgical microscope, manufactured and sold by Olympus Optical Co. Ltd., Japan). With respect to each of the first, second and third cross-sections of the sample, cross-sections of liquid-phase domains, which were dispersed in the continuous solid-phase domain, were examined to determine the percentages of the total area of cross-sections of the liquid-phase domains, based on the area of each cross-section of the sample. The average of the percentages of the respective total areas of cross-sections of the liquid-phase domains, obtained with respect to the first, second and third cross-sections of the sample, was taken as the volume percentage of the liquid-phase domains of the hybrid polymeric electrolyte.

(ii) Evaluation of Oxidation-reduction Stability

One side of a hybrid polymeric electrolyte sheet was covered with a stainless steel sheet, and the halves of the other side of the sheet were respectively covered with 2 metallic lithium sheets, to thereby obtain an electrochemical cell. The electrochemical cell was subjected to a potential sweep according to cyclic voltammetry, using the stainless steel sheet as the working electrode and using the 2 metallic lithium sheets as the counter electrode and the reference electrode, respectively. The potential sweep was conducted under measurement conditions such that the sweep rate was 5 mV/second, the range of sweep potential was from 0 to 5 V(vs Li/Li$^+$), and measuring apparatuses were function generator Model HA-303 and dual potentiogalvanostat Model HB-104 (both manufactured and sold by Hokuto Denko Corporation, Japan). Results of the potential sweep were examined as to whether or not a current peak due to oxidation or reduction had occurred. When no current peak due to oxidation or reduction is observed, it indicates that the hybrid polymeric electrolyte is electrochemically stable.

EXAMPLE 1

A hexafluoropropylene/vinylidene fluoride copolymer resin (hexafluoropropylene content: 5% by weight) was subjected to extrusion molding at an extrusion die temperature of 230° C. by means of an extrusion molding machine (manufactured and sold by Toshiba Machine Co. Ltd., Japan), thereby obtaining a molded sheet having a thickness of 150 μm. For effecting a crosslinking reaction, the obtained molded sheet was irradiated with electron beams so that the irradiation dose became 10 Mrads. Then, the irradiated sheet was subjected to vacuum drying at 60° C., while removing HF gas generated by the drying. Subsequently, the sheet was further irradiated with electron beams so that the irradiation dose became 15 Mrads. The sheet was then immersed in a mixture of flon HFC134a and water (flon/water weight ratio: 99/1) and the whole was allowed to stand at 70° C. under a pressure of 20 kg/cm² for 24 hours in a sealed vessel so as to impregnate the sheet with the mixture of flon HFC134a and water (flon/water mixture content in the resultant impregnated sheet: 6.5% by weight). Subsequently, the sheet was taken out from the vessel and immediately heated at 180° C. (furnace temperature : 210° C.) for 10 seconds, thereby foaming the sheet to obtain a white foamed sheet having a thickness of 270 μm (expansion ratio: 8 times). The volume percentage of the closed cells contained in the foamed sheet was 87%, based on the entire volume of foamed sheet [as measured by an air comparison pycnometer (Model 930, manufactured and sold by Toshiba Beckman, Japan)].

The foamed sheet was placed in a non-aqueous electrolyte solution obtained by dissolving lithium tetrafluoroborate (LiBF$_4$) in a mixed solvent of ethylene carbonate (EC), propylene carbonate (PC) and γ-butyrolactone(γ-BL) (EC/PC/γ-BL weight ratio=1/1/2, and LiBF$_4$ concentration: 1 mol/liter), and kept therein for 2 hours at 100° C. so as to impregnate the foamed sheet with the non-aqueous electrolytic solution, thereby obtaining a swollen foamed sheet as a hybrid polymeric electrolyte. The obtained hybrid polymeric electrolyte had a thickness of 350 μm.

The volume percentage of the liquid-phase domains of the hybrid polymeric electrolyte was 64.7%. Specifically, in the first, second and third cross-sections of the sample, the percentages of the total area of cross-sections of the liquid-phase domains were, respectively, 65%, 65% and 64%, based on the area of each cross-section. In each of the first, second and third cross-sections of the sample, circular cross-sections of liquid-phase domains, which were uniformly dispersed in the continuous solid-phase domain and each had a size of from 5 to 15 μm in terms of the average value of the long axis and short axis of each domain, were observed. There was no liquid-phase domain communicating with the original surface of the hybrid polymeric electrolyte.

The amount of the non-aqueous electrolyte solution in the hybrid polymeric electrolyte was 85% by weight, as calculated from the weight difference between the foamed sheet (before the impregnation of the non-aqueous electrolyte solution) and the hybrid polymeric electrolyte.

When the hybrid polymeric electrolyte was subjected to measurement of water permeability by a method in which the hybrid polymeric electrolyte was first immersed in ethanol for 4 hours and then in water for 1 hour, and then cut into a disc having a diameter of 25 mm; the obtained disc was held by a membrane holder having an effective area of 3.5 cm²; and a static water pressure of 1 atm at 26° C. was applied to the disc held by the membrane holder, it was found that the disc had no water permeability.

When the hybrid polymeric electrolyte was subjected to measurement of a glass transition temperature by differential thermal analysis, it was found that it had a glass transition temperature of −102° C. Since it had previously been found that the foamed sheet (before the impregnation of the electrolyte solution ) had a glass transition temperature of −51° C., it was confirmed that the continuous solid polymer matrix of the hybrid polymeric electrolyte was impregnated with the electrolytic solution.

When the oxidation-reduction stability of the hybrid polymeric electrolyte was evaluated by cyclic voltammetry over a sweep potential range of from 0 to 5 V (vs Li/Li$^+$), it was found that no current peak due to oxidation or reduction was observed except for a reduction current observed in the potential range of less than 0.5 V, indicating that the hybrid polymeric electrolyte is electrochemically stable over the potential range of from 0.5 to 5 V.

A sample of the obtained hybrid polymeric electrolyte sheet, having a size of 1 cm×1 cm, was sandwiched between two stainless steel sheets each having a thickness of 10 μm, a length of 60 mm and a width of 6 mm, thereby obtaining a laminate structure. The sandwiched hybrid polymeric electrolyte sheet was subjected to measurement of an alternating-current impedance, using the above two stainless steel sheets as electrodes. (The alternating-current impedance was measured by means of impedance measurement apparatus Model 398 manufactured and sold by Seiko EG&G, Japan; measurement frequency: 100 kHz–1 Hz.) The ionic conductivity value was calculated from the real part of the complex impedance expressed in the form of a Nyquist plot. As a result, it was found that the ionic conductivity was 2.8×10$^{-3}$ S/cm.

EXAMPLE 2

A hexafluoropropylene/vinylidene fluoride copolymer resin (hexafluoropropylene content: 5% by weight) was subjected to extrusion molding in substantially the same manner as in Example 1, thereby obtaining a molded sheet having a thickness of 50 μm. The obtained molded sheet was irradiated with electron beams so that the irradiation dose became 10 Mrads. The sheet was then immersed in a mixture of flon HFC134a and water in a vessel in substantially the same manner as in Example 1 so as to impregnate the sheet with the mixture of flon HFC134a and water (flon/water mixture content in the resultant impregnated sheet: 5% by weight). Subsequently, the sheet was taken out from the vessel and immediately heated at 180° C. (furnace temperature: 210° C.) for 5 seconds, thereby foaming the sheet to obtain a white foamed sheet having a thickness of 72 μm (expansion ratio: 3 times). The volume percentage of the closed cells contained in the foamed sheet was 68%, based on the entire volume of foamed sheet [as measured by an air comparison pycnometer (Model 930, manufactured and sold by Toshiba Beckman, Japan)].

The foamed sheet was placed in a non-aqueous electrolytic solution obtained by dissolving lithium tetrafluoroborate (LiBF$_4$) in a mixed solvent of ethylene carbonate (EC), propylene carbonate (PC) and γ-butyrolactone (γ-BL) (EC/PC/γ-BL weight ratio=1/1/2, and LiBF$_4$ concentration: 1 mol/liter), and kept therein for 3 hours at 100° C. so as to impregnate the foamed sheet with the non-aqueous electrolytic solution, thereby obtaining a swollen foamed sheet as a hybrid polymeric electrolyte. The obtained hybrid polymeric electrolyte had a thickness of 120 μm.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain and each had a size of from 3 to 12 μm in terms of the average value of the long axis and short axis of each domain, were observed. In the first, second and third cross-sections of the sample, the percentages of the total cross-sectional areas of the liquid-phase domains were, respectively, 54%, 48% and 53%, based on the area of each cross-section of the sample. From these results, it was found that the volume percentage of the liquid-phase domains in the hybrid polymeric electrolyte was 51.7%. It was also found that any of the first, second and third cross-sections of the sample showed no liquid-phase domain communicating with the original surface of the sheet.

The amount of the non-aqueous electrolyte solution in the hybrid polymeric electrolyte was 74% by weight, as calculated from the weight difference between the foamed sheet (before the impregnation of the non-aqueous electrolyte solution) and the hybrid polymeric electrolyte.

The hybrid polymeric electrolyte was subjected to measurement of water permeability in the same manner as in Example 1. As a result, it was found that the hybrid polymeric electrolyte had no water permeability.

The oxidation-reduction stability of the hybrid polymeric electrolyte was evaluated in the same manner as in Example 1. As a result, it was found that no current peak due to oxidation or reduction was observed in a potential range of from 0.7 to 5 V, indicating that the hybrid polymeric electrolyte is electrochemically stable over the potential range of from 0.7 to 5 V.

A sample of the obtained hybrid polymeric electrolyte sheet, having a size of 1 cm×1 cm, was sandwiched between two stainless steel sheets, thereby obtaining a laminate structure. In the same manner as in Example 1, the sandwiched hybrid polymeric electrolyte sheet was subjected to measurement of an alternating-current impedance, using two stainless steel sheets as electrodes. The ionic conductivity value was calculated from the real part of the complex impedance expressed in the form of a Nyquist plot. As a result, it was found that the ionic conductivity was $3.9 \times 10^{-3}$ S/cm.

The above laminate structure comprised of the hybrid polymeric electrolyte sheet sandwiched between stainless steel sheets was further sandwiched between two alumina plates each having a thermocouple embedded therein, and the resultant structure was held in a hydraulic press having heater means. Then, the hybrid polymeric electrolyte was subjected to measurement of an alternating-current impedance while gradually elevating the temperature of the laminate structure with the heater means from room temperature to 220° C., and a change in the alternating-current impedance in accordance with the temperature elevation was measured. The alternating-current impedance was measured by means of LCR meter (manufactured and sold by Hioki Ltd., Japan; measurement frequency: 1 kHz). As a result, a smooth change in the alternating-current impedance was observed over the temperature range of from room temperature to 220° C.

After the above measurement of the change in the alternating-current impedance over the temperature range of room temperature to 220° C., the alumina plates and stainless steel sheets were removed from the hybrid polymeric electrolyte sheet, and the hybrid polymeric electrolyte sheet was examined. As a result, no distortion of the hybrid polymeric electrolyte sheet was observed. Therefore, it was found that the hybrid polymeric electrolyte sheet does not suffer heat distortion at a temperature of at least 220° C. or less, indicating that it has excellent heat resistance.

EXAMPLE 3

Powder of lithium cobalt oxide ($LiCoO_2$; average particle diameter: 10 $\mu$m), carbon black and poly(vinylidene fluoride) as a binder were mixed in a 5% by weight solution of poly(vinylidene fluoride) in N-methylpyrrolidone (NMP), so that the weight percentages of $LiCoO_2$, carbon black and poly(vinylidene fluoride) (dry weight) became 85%, 8% and 7%, respectively, based on the total weight of the $LiCoO_2$, carbon black and poly(vinylidene fluoride). The resultant mixture was applied onto an aluminum sheet and allowed to dry, thereby obtaining a coating having a thickness of 115 $\mu$m on the aluminum sheet (as a positive electrode).

Powder of needle coke (NC) having an average particle diameter of 12 $\mu$m was homogeneously mixed with a 5% by weight solution of poly(vinylidene fluoride) in NMP, thereby obtaining a slurry (NC/polymer dry weight ratio= 92:8). The obtained slurry was applied onto a copper sheet by doctor blade method and allowed to dry, thereby obtaining a coating having a thickness of 125 $\mu$m on the copper sheet (as a negative electrode).

The hybrid polymeric electrolyte sheet prepared in Example 2 was sandwiched between the coated sides of the above-prepared NC negative electrode and $LiCoO_2$ positive electrode so that the non-coated sides of the current collectors of the positive and negative electrodes were exposed, and the hybrid polymeric electrolyte sheet and the electrodes were pressed against each other at 120° C., thereby obtaining a laminate structure. Stainless steel sheets (as electric terminals for taking a current) were brought into contact with the respective current collectors of the positive and negative electrodes of the laminate structure, and the laminate structure was further laminated with a polyethylene/aluminum/polyethylene terephthalate laminate sheet having a thickness of 50 $\mu$m, thereby obtaining a sheet-shaped battery.

The electric terminals of the battery were connected to a charge/discharge testing device (Model 101SM, manufactured and sold by Hokuto Denko Corporation, Japan), and the battery was subjected to charge/discharge cycle testing at a current density per surface area of the electrodes of 1 $mA/cm^2$. The charging operation was conducted at a constant potential of 4.2 V. After the charging operation, the potential between the electrodes was 4.2 V. The discharging operation was conducted at a constant current, and discontinued when the electric potential was decreased to 2.7 V. As a result of the charge/discharge testing, it was found that the discharge/charge efficiency (ratio) of the first cycle was 80%, and that the discharge capacity of the first discharge was 212 mAh/g of the carbon in the negative electrode. It was also found that, with respect to the cycles after the first cycle, the discharge/charge efficiency (ratio) was 98% or more, and that in the discharge capacity of the 10th cycle was 195 mAh/g of the carbon in the negative electrode. These results show that this battery is capable of being repeatedly charged and discharged and hence operable as a secondary battery.

Comparative Example 1

10 g of pellets of a hexafluoropropylene/vinylidene fluoride copolymer resin (hexafluoropropylene content: 5% by weight) prepared in Example 1, 40 g of acetone and 30 g of a non-aqueous electrolytic solution obtained by dissolving $LiBF_4$ in a mixed solvent of ethylene carbonate (EC), propylene carbonate (PC) and γ-butyrolactone (γ-BL) (EC/PC/γ-BL weight ratio=1/1/2, and $LiBF_4$ concentration: 1 mol/liter) were mixed together, followed by heating at 60° C. for 6 hours, thereby obtaining a homogeneous solution. The obtained homogeneous solution was applied onto a glass plate in an atmosphere of argon gas and acetone was allowed to evaporate, thereby obtaining a hybrid polymeric electrolyte sheet on the glass plate.

The hybrid polymeric electrolyte sheet was removed from the glass plate and a sample for observing cross-sections was prepared from the removed hybrid polymeric electrolyte sheet in substantially the same manner as in Example 1, and each of the first, second and third cross-sections of the sample was examined. As a result, it was found that each of the first, second and third cross-sections had a solid-phase domain only and no liquid-phase domain having a size of 1 µm or more, that is, the volume percentage of the liquid-phase domains in the hybrid polymeric electrolyte was 0%.

A sample of the obtained hybrid polymeric electrolyte sheet, having a size of 1 cm×1 cm, was sandwiched between two stainless steel sheets, thereby obtaining a laminate structure. In the same manner as in Example 1, the sandwiched hybrid polymeric electrolyte sheet was subjected to measurement of an alternating-current impedance, using two stainless steel sheets as electrodes. The ionic conductivity was calculated from the real part of the complex impedance expressed in the form of a Nyquist plot. As a result, it was found that the ionic conductivity was $0.9 \times 10^{-3}$ S/cm.

The above laminate structure comprised of the hybrid polymeric electrolyte sheet sandwiched between stainless sheets was further sandwiched between two alumina plates each having a thermocouple embedded therein, and the resultant structure was held in a hydraulic press having heater means. Then, the hybrid polymeric electrolyte was subjected to measurement of an alternating-current impedance while gradually elevating the temperature of the laminate structure with the heater means from room temperature to 110° C., and a change in the alternating-current impedance in accordance with the temperature elevation was measured. The alternating-current impedance was measured by means of LCR meter (manufactured and sold by Hioki Ltd., Japan; measurement frequency: 1 kHz). As a result, a smooth change in the alternating-current impedance was observed over the temperature range of from room temperature to 110° C., while at the temperature of 110° C., a drastic decrease of resistance was observed. At the same time, leakage of molten substance between two electrodes was also observed. Therefore, it is understood that the drastic decrease of resistance was due to the thickness decrease of the hybrid polymeric electrolyte sheet resulting from melt distortion of the hybrid polymeric electrolyte sheet.

After the above measurement of the change in the alternating-current impedance over the temperature range of room temperature to 110° C., the alumina plates and stainless steel sheets were removed from the hybrid polymeric electrolyte sheet, and the hybrid polymeric electrolyte sheet was examined. As a result, a melt flow of the hybrid polymeric electrolyte sheet was observed. Therefore, it was found that the hybrid polymeric electrolyte sheet has poor heat resistance.

EXAMPLE 4

A hexafluoropropylene/vinylidene fluoride copolymer resin (hexafluoropropylene content: 5% by weight) was subjected to extrusion molding in substantially the same manner as in Example 1, thereby obtaining a molded sheet having a thickness of 50 µm. The obtained molded sheet was irradiated with electron beams so that the irradiation dose became 10 Mrads. The sheet was then immersed in a mixture of flon HFC134a and water in a vessel in substantially the same manner as in Example 1 so as to impregnate the sheet with the mixture of flon HFC134a and water (flon/water mixture content in the resultant impregnated sheet: 5% by weight) in a vessel. Subsequently, the sheet was taken out from the vessel and immediately heated at 180° C. (furnace temperature: 210° C.) for 5 seconds, thereby foaming the sheet to obtain a white foamed sheet having a thickness of 72 µm (expansion ratio: 3 times). The volume percentage of the closed cells contained in the foamed sheet was 68%, based on the entire volume of foamed sheet [as measured by an air comparison pycnometer (Model 930, manufactured and sold by Toshiba Beckman, Japan)]. Subsequently, the sheet was further irradiated with electron beams so that the irradiation dose became 15 Mrads. The sheet was then immersed in NMP in a vessel and the whole was heated at 90° C. for 3 hours. The heated sheet was examined with respect to the melt property, and it was found that the sheet was not distorted. Subsequently, the sheet was taken out from the vessel and washed with acetone, thereby obtaining a dried sheet. The weight of the dried sheet was measured, and from the weight of the dried sheet, the weight percentage of the crosslinked polymer segment which was effected by irradiation of beams was obtained. The weight percentage of the crosslinked polymer segment was 55%.

The sheet was placed in a non-aqueous electrolytic solution obtained by dissolving lithium tetrafluoroborate ($LiBF_4$) in a mixed solvent of ethylene carbonate (EC), propylene carbonate (PC) and γ-butyrolactone (γ-BL) (EC/PC/γ-BL weight ratio=1/1/2, and $LiBF_4$ concentration: 1.5 mol/liter), and kept therein for 2 hours at 100° C. so as to impregnate the foamed sheet with the non-aqueous electrolytic solution, thereby obtaining a swollen foamed sheet as a hybrid polymeric electrolyte. The obtained hybrid polymeric electrolyte had a thickness of 105 µm.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain and each had a size of from 2 to 10 µm in terms of the average value of the long axis and short axis of each domain, were observed. In the first, second and third cross-sections of the sample, the percentages of the total cross-sectional areas of the liquid-phase domains were, respectively, 51%, 48% and 45%, based on the area of each cross-section of the sample. From these results, it was found that the volume percentage of the liquid-phase domains in the hybrid polymeric electrolyte was 48%. It was also found that any of the first, second and third cross-sections of the sample showed no liquid-phase domain communicating with the original surface of the sheet.

The amount of the non-aqueous electrolyte solution in the hybrid polymeric electrolyte was 76% by weight, as calculated from the weight difference between the foamed sheet (before the impregnation of the non-aqueous electrolyte solution) and the hybrid polymeric electrolyte.

A sample of the obtained hybrid polymeric electrolyte sheet, having a size of 1 cm×1 cm, was sandwiched between two stainless steel sheets, thereby obtaining a laminate structure. In the same manner as in Example 1, the sandwiched hybrid polymeric electrolyte sheet was subjected to measurement of an alternating-current impedance, using two stainless steel sheets as electrodes. The ionic conductivity value was calculated from the real part of the complex impedance expressed in the form of a Nyquist plot. As a result, it was found that the ionic conductivity was $3.2 \times 10^{-3}$ S/cm.

The above laminate structure comprised of the hybrid polymeric electrolyte sheet sandwiched between stainless sheets was further sandwiched between two alumina plates each having a thermocouple embedded therein, and the resultant structure was held in a hydraulic press having heater means. Then, the hybrid polymeric electrolyte was subjected to measurement of an alternating-current impedance while gradually elevating the temperature of the laminate structure with the heater means from room temperature to 220° C., and a change in the alternating-current impedance in accordance with the temperature elevation was measured. The alternating-current impedance was measured by means of LCR meter (manufactured and sold by Hioki Ltd., Japan; measurement frequency: 1 kHz). As a result, a smooth change in the alternating-current impedance was observed over the temperature range of from room temperature to 220° C.

After the above measurement of the change in the alternating-current impedance over the temperature range of room temperature to 220° C., the alumina plates and stainless steel sheets were removed from the hybrid polymeric electrolyte sheet, and the hybrid polymeric electrolyte sheet was examined. As a result, no distortion of the hybrid polymeric electrolyte sheet was observed. Therefore, it was found that the hybrid polymeric electrolyte sheet does not suffer heat distortion at a temperature of at least 220° C. or less, indicating that it has excellent heat resistance.

EXAMPLE 5

The foamed polymer sheet prepared in Example 4 was sandwiched, in substantially the same manner as in Example 3, between the NC negative electrode and the $LiCoO_2$ positive electrode both obtained in Example 3 and the foamed polymer sheet and the electrodes were pressed against each other at 120° C., thereby obtaining a laminate structure.

Stainless steel sheets (as electric terminals for taking a current) were brought into contact with the respective current collectors of the positive and negative electrodes of the laminate structure, and the laminate structure was further laminated with a polyethylene/aluminum/polyethylene terephthalate laminate sheet having a thickness of 50 $\mu$m, thereby obtaining a sheet-shaped battery.

The obtained battery was subjected to charge/discharge cycle testing in the same manner as in Example 3. As a result, it was found that the discharge/charge efficiency (ratio) of the first cycle was 79%, and that the discharge capacity of the first discharge was 211 mAh/g of the carbon in the negative electrode. It was also found that, with respect to the cycles after the first cycle, the discharge/charge efficiency (ratio) was 99% or more. These results show that this battery is capable of being repeatedly charged and discharged and hence operable as a secondary battery.

EXAMPLE 6

The electrolyte-non-impregnated, crosslinked foamed polymer sheet prepared in Example 1 was sandwiched between the NC negative electrode and the $LiCoO_2$ positive electrode both obtained in Example 3 so that the non-coated sides of the current collectors of the positive and negative electrodes were exposed, and the crosslinked foamed polymer sheet and the electrodes were pressed against each other at 120° C., thereby obtaining a laminate structure. The current collectors of the positive and negative electrodes of the laminate structure were perforated with a needle so that the current collectors had 400 holes (each having a diameter of 150 $\mu$m) per $cm^2$ of the exposed, non-coated sides of the current collectors.

The laminate structure was placed in a non-aqueous electrolyte solution obtained by dissolving lithium tetrafluoroborate ($LiBF_4$) in a mixed solvent of ethylene carbonate (EC), propylene carbonate (PC) and γ-butyrolactone(γ-BL) (EC/PC/γ-BL weight ratio=1/1/2, and $LiBF_4$ concentration: 1.5 mol/liter), and kept therein for 2 hours at 100° C. so as to impregnate the laminate structure with the non-aqueous electrolytic solution, thereby obtaining a laminate structure containing a swollen foamed sheet as a hybrid polymeric electrolyte.

Stainless steel sheets (as electric terminals for taking a current) were brought into contact with the respective current collectors of the positive and negative electrodes, and the laminate structure was then further laminated with a polyethylene/aluminum/polyethylene terephthalate laminate sheet having a thickness of 50 $\mu$m. The resultant laminate structure was inserted in a packaging bag so that the other end portion of each stainless steel electric terminal is positioned outside of the packaging bag, and the opening of the bag was sealed by means of a heat vacuum sealer at 120° C. while keeping the inside of the bag under reduced pressure, thereby obtaining a battery. The obtained battery was subjected to charge/discharge cycle testing (current density per surface area of the electrodes: 1 $mA/cm^2$) in the same manner as in Example 3. As a result, it was found that the discharge/charge efficiency (ratio) of the first cycle was 82%, and that the discharge capacity of the first discharge was 210 mAh/g of the carbon in the negative electrode. It was also found that, with respect to the cycles after the first cycle, the discharge/charge efficiency (ratio) was 98% or more, and that the discharge capacity of the 100th cycle was 84% of the discharge capacity of the first cycle. These results show that this battery is capable of being repeatedly charged and discharged and hence operable as a secondary battery.

EXAMPLE 7

A hexafluoroporpylene/vinylidene fluoride copolymer resin (hexafluoropropylene content: 5% by weight) was subjected to extrusion molding in substantially the same manner as in Example 1, thereby obtaining a molded sheet having a thickness of 50 $\mu$m. For effecting a crosslinking reaction, the obtained molded sheet was irradiated with electron beams so that the irradiation dose become 10 Mrads. The irradiated sheet was then immersed in a mixture of flon HFC134a and water in a vessel in substantially the same manner as in Example 1 so as to impregnate the sheet with the mixture of flon HFC134a and water (flon/water mixture content of the resultant impregnated sheet: 5% by weight). Subsequently, the sheet was taken out from the vessel and immediately heated at 180° C. (furnace temperature : 210° C.) for 5 seconds, thereby foaming the sheet to obtain a white foamed sheet having a thickness of 68 $\mu$m. The volume percentage of the closed cells contained in the foamed sheet was 70% by volume, based on the entire volume of the foamed sheet [as measured by an air comparison pycnometer (Model 930, manufactured and sold by Toshiba Beckman, Japan)].

The foamed sheet was sandwiched between two stainless steel sheets, thereby obtaining a laminate structure. The sandwiched foamed sheet was placed in a non-aqueous electrolytic solution obtained by dissolving lithium tetrafluoroborate ($LiBF_4$) in a mixed solvent of ethylene carbonate (EC) and propylene carbonate (PC) (EC/PC weight ratio=1/1, and $LiBF_4$ concentration: 1 mol/liter), and kept therein for 3 hours at 100° C. so as to impregnate the sandwiched foamed sheet with the non-aqueous electrolytic solution, thereby obtaining a swollen foamed sheet as a hybrid polymeric electrolyte. The obtained hybrid polymeric electrolyte had a thickness of 95 $\mu$m.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain and each had a size of from 2 to 9 μm in terms of the average value of the long axis and short axis of each domain, were observed. In the first, second and third cross-sections of the sample, the percentages of the total cross-sectional areas of the liquid-phase domains were, respectively, 38%, 30% and 35%, based on the area of each cross-section of the sample. From these results, it was found that the volume percentage of the liquid-phase domains in the hybrid polymeric electrolyte was 34.3%. It was also found that any of the first, second and third cross-sections of the sample showed no liquid-phase domain communicating with the original surface of the sheet.

The hybrid polymeric electrolyte was subjected to measurement of water permeability in the same manner as in Example 1. As a result, it was found that the hybrid polymeric electrolyte had no water permeability.

The amount of the non-aqueous electrolytic solution in the hybrid polymeric electrolyte was 75% by weight, as calculated from the weight difference between the foamed sheet (before the impregnation of the non-aqueous electrolyte solution) and the hybrid polymeric electrolyte.

In the same manner as in Example 1, the hybrid polymeric electrolyte sheet was subjected to measurement of an alternating-current impedance, using two stainless sheets as electrodes. As a result, it was found that the ionic conductivity value of the hybrid polymeric electrolyte sheet as measured at room temperature was $3.4 \times 10^{-3}$ S/cm. The hybrid polymeric electrolyte sheet was heated to 150° C. and then, cooled to room temperature. Then, the obtained hybrid polymeric electrolyte sheet was subjected to measurement of an alternating-current impedance again. As a result, it was found that the ionic conductivity was $3.5 \times 10^{-3}$ S/cm. These results show that the ionic conductivity of the hybrid polymeric electrolyte sheet is hardly changed by heat history.

EXAMPLE 8

The $LiCoO_2$ positive electrode and NC negative electrode (both obtained in Example 3) were individually cut into a sample having a size of 2 cm×2 cm. The electrolyte-non-impregnated, crosslinked foamed sheet prepared in Example 7 was cut into a sample having a size of 2.3 cm×2.3 cm. The sample of the foamed sheet was sandwiched between the two samples of electrode sheets so that the non-coated sides of the current collectors of the positive and negative electrodes were exposed, and the crosslinked foamed sheet and the electrodes were pressed against each other at 120° C., thereby obtaining a laminate structure. The obtained laminate structure was placed in a non-aqueous electrolytic solution obtained by dissolving lithium tetrafluoroborate ($LiBF_4$) in a mixed solvent of ethylene carbonate (EC), propylene carbonate (PC) and γ-butyrolactone (γ-BL) (EC/PC/γ-BL weight ratio=1/1/2, and $LiBF_4$ concentration: 1 mol/ liter), and kept therein so as to impregnate the laminate structure with the non-aqueous electrolytic solution, thereby obtaining a laminate structure containing a swollen foamed sheet as a hybrid polymeric electrolyte. The obtained impregnated laminate structure was heated at 100° C. for 30 minutes to obtain a battery. By the heating, the color of the swollen foamed sheet as a hybrid polymeric electrolyte changed from white to transparency, which shows that the impregnation of the foamed sheet with the non-aqueous electrolytic solution was performed. With respect to the swollen foamed sheet, there was almost no change in size in a direction perpendicular to the thicknesswise direction of the sheet, as compared to the size of the non-impregnated foamed sheet.

Two stainless steel terminals were brought into contact with the respective current collectors of the positive and negative electrodes, and the battery was laminated with a laminate sheet of polyethylene, aluminum and polyethylene terephthalate at 120° C. for 30 seconds, thereby obtaining a sheet-shaped battery.

The obtained battery was subjected to charge/discharge cycle testing (current density per surface area of the electrodes: 1 mA/cm$^2$) using a charge/discharge testing device (Model 101SM6, manufactured and sold by Hokuto Denko Corporation, Japan). The charging operation was carried out at a constant potential of 4.2 V. After the charging operation, the potential between the electrodes of the battery was 4.2 V. Accordingly, it was confirmed that the battery was charged. The discharging operation was carried out at a constant current, and discontinued when the potential between the electrodes was decreased to 2.7 V. As a result of the charge/discharge cycle testing, it was found that the discharge/charge efficiency (ratio) of the first cycle was 78%, and the discharge/charge efficiency (ratio) of the cycles after the first cycle was 99% or more. These results show that this battery is capable of being repeatedly charged and discharged and hence operable as a secondary battery.

EXAMPLE 9

A hexafluoropropylene/vinylidene fluoride copolymer resin (hexafluoropropylene content: 5%by weight) was subjected to extrusion molding in substantially the same manner as in Example 1, thereby obtaining a molded sheet having a thickness of 168 μm. For effecting a crosslinking reaction, the obtained molded sheet was irradiated with electron beams so that the irradiation dose became 10 Mrads. Then, the irradiated sheet was subjected to vacuum drying at 60° C., while removing HF gas generated by the drying, to thereby obtain polymer sheet A.

The obtained polymer sheet A was then immersed in a mixture of flon HFC134a and water in a vessel in substantially the same manner as in Example 1 so as to impregnate polymer sheet A with the mixture of flon HFC134a and water. Subsequently, polymer sheet A was taken out from the vessel and immediately heated at 180° C. (furnace temperature: 210° C.) for 10 seconds, thereby foaming polymer sheet A, to thereby obtain a white foamed sheet having a thickness of 401 μm (expansion ratio: 15 times) as polymer sheet B. The volume percentage of the closed cells contained in the foamed sheet was 92% by volume, based on the entire volume of foamed sheet. Polymer sheet B was further irradiated with electron beams so that the irradiation dose became 30 Mrads. The irradiated foamed sheet was subjected to vacuum drying at 60° C., and cut into a sample having a size of 30 mm×30 mm.

The sample was placed in a non-aqueous electrolytic solution obtained by dissolving lithium tetrafluoroborate ($LiBF_4$) in a mixed solvent of ethylene carbonate (EC), propylene carbonate (PC) and γ-butyrolactone (γ-BL) (EC/PC/γ-BL weight ratio=1/1/2, and $LiBF_4$ concentration: 1 mol/liter), and kept therein for 1 hour at 100° C. so as to impregnate the sample with the non-aqueous electrolytic solution, thereby obtaining a swollen foamed sheet as a hybrid polymeric electrolyte. The obtained hybrid polymeric electrolyte had a size of 37 mm×30 mm and a thickness of 372 μm. The area of the electrolyte was 123% of the area of the sample prior to the impregnation with the non-aqueous electrolytic solution.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain and each had a size of from 2 to 25 μm in terms of the average value of the long axis and short axis of each domain, were observed. In the first, second and third cross-sections of the sample, the percentages of the total cross-sectional areas of the liquid-phase domains were, respectively, 83%, 78% and 82%, based on the area of each cross-section of the sample. From these results, it was found that the volume percentage of the liquid-phase domains in the hybrid polymeric electrolyte was 81%. It was also found that any of the first, second and third cross-sections of the sample showed no liquid-phase domain communicating with the original surface of the sheet.

The hybrid polymeric electrolyte was subjected to measurement of water permeability in the same manner as in Example 1. As a result, it was found that the hybrid polymeric electrolyte had no water permeability.

The amount of the non-aqueous electrolyte solution in the hybrid polymeric electrolyte was 90% by weight, as calculated from the weight difference between the foamed sheet (prior to the impregnation of the non-aqueous electrolyte solution) and the hybrid polymeric electrolyte.

The ionic conductivity value was calculated in the same manner as in Example 1. As a result, it was found that the ionic conductivity was $2.4 \times 10^{-3}$ S/cm.

Comparative Example 2

The polymer sheet A prepared in Example 9 was cut into a sample having a size of 30 mm×30 mm. The sample was impregnated with a non-aqueous electrolytic solution in substantially the same manner as in Example 9, thereby obtaining a swollen foamed sheet as a hybrid polymeric electrolyte. The obtained hybrid polymeric electrolyte had a size of 58 mm×40 mm and a thickness of 335 μm. The area of the electrolyte was 240% of the area of the sample prior to the impregnation with the non-aqueous electrolytic solution. From the above, the increase in the area of the sample by the impregnation is markedly larger than that in Example 9.

EXAMPLE 10

A powder of hexafluoropropylene/vinylidene fluoride copolymer (hexafluoropropylene content: 5% by weight) was subjected to extrusion molding at 230° C., thereby obtaining a molded sheet having a thickness of 150 μm. The obtained molded sheet was irradiated with electron beams so that the irradiation dose became 10 Mrads. The irradiated sheet was then immersed in a mixture of flon HFC134a and water in a vessel in substantially the same manner as in Example 1 so as to impregnate the sheet with the mixture of flon HFC134a and water (flon/water mixture content in the resultant impregnated sheet: 7% by weight). Subsequently, the sheet was taken out from the vessel and immediately heated at 180° C. (furnace temperature: 210° C.) for 10 seconds, thereby foaming the sheet to obtain a white foamed sheet having a thickness of 280 μm (expansion ratio: 8 times). The obtained foamed sheet contained closed cells having a diameter of from 10 to 15 μm. The volume percentage of the closed cells contained in the foamed sheet was 83%, based on the entire volume of the foamed sheet (as measured by an air comparison pycnometer Model 930, manufactured and sold by Toshiba Beckman, Japan).

The foamed sheet was cut into a sample having a size of 5 cm×5 cm. The sample was placed in a mixture of 50 ml of acetone and 50 ml of a non-aqueous electrolytic solution obtained by dissolving lithium tetrafluoroborate ($LiBF_4$) in a mixed solvent of ethylene carbonate (EC) and propylene carbonate (PC) (EC/PC weight ratio=1/1, and $LiBF_4$ concentration: 1 mol/liter), and kept therein for 24 hours at 40° C. so as to impregnate the sample with the non-aqueous electrolytic solution, thereby obtaining a swollen foamed sheet. The obtained swollen foamed sheet was treated at room temperature under a pressure of $10^{-3}$ Torr for 30 minutes. Thus, a hybrid polymeric electrolyte was obtained. The obtained hybrid polymeric electrolyte had a thickness of 320 μm and a size of 5 cm×5 cm.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain and each had a size of from 9 to 15 μm in terms of the average value of the long axis and short axis of each domain, were observed. In the first, second and third cross-sections of the sample, the percentages of the total cross-sectional areas of the liquid-phase domains were, respectively, 78%, 75% and 80%, based on the area of each cross-section of the sample. From these results, it was found that the volume percentage of the liquid-phase domains in the hybrid polymeric electrolyte was 78%. It was also found that any of the first, second and third cross-sections of the sample showed no liquid-phase domain communicating with the original surface of the sheet.

The hybrid polymeric electrolyte was subjected to measurement of water permeability in the same manner as in Example 1. As a result, it was found that the hybrid polymeric electrolyte had no water permeability.

The amount of the non-aqueous electrolytic solution in the hybrid polymeric electrolyte was 85% by weight, as calculated from the weight difference between the foamed sheet (prior to the impregnation of the non-aqueous electrolytic solution) and the hybrid polymeric electrolyte.

When the hybrid polymeric electrolyte was subjected to measurement of a glass transition temperature by differential thermal analysis, it was found that it had a glass transition temperature of −100° C. Since it had previously been found that the foamed sheet (prior to the impregnation of the electrolyte solution) had a glass transition temperature of −51° C., it was confirmed that the continuous solid polymer matrix of the hybrid polymeric electrolyte was swollen with the electrolytic solution.

The sample of the obtained hybrid polymeric electrolyte sheet was sandwiched between two stainless steel sheets, thereby obtaining a laminate structure. In the same manner as in Example 1, the sandwiched hybrid polymeric electrolyte sheet was subjected to measurement of an alternating-current impedance, using two stainless steel sheets as electrodes. As a result, it was found that the ionic conductivity was $1.1 \times 10^{-3}$ S/cm.

EXAMPLE 11

The foamed sheet obtained in Example 10 was cut into a sample having a size of 5 cm×5 cm. The sample was placed in a mixture of 50 ml of tetrahydrofuran and 50 ml of a non-aqueous electrolytic solution obtained by dissolving lithium tetrafluoroborate ($LiBF_4$) in a mixed solvent of ethylene carbonate (EC), propylene carbonate (PC) and γ-butyrolactone (γ-BL) (EC/PC/γ-BL weight ratio=1/1/2, and $LiBF_4$ concentration: 1 mol/liter), and kept therein for 8 hours at 50° C. so as to impregnate the sample with the mixture of the tetrahydrofuran and the non-aqueous electrolytic solution, thereby obtaining a swollen transparent foamed sheet. Subsequently, in a flow of an argon gas, the obtained swollen transparent foamed sheet was maintained at room temperature for 3 hours so as to evaporate the tetrahydrofuran, thereby obtaining a transparent sheet as a hybrid polymeric electrolyte. The obtained hybrid polymeric electrolyte sheet had a size of 5.5 cm×5.5 cm and a thickness of 335 μm.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain and each had a size of from 9 to 15 μm in terms of the average value of the long axis and short axis of each domain, were observed. In the first, second and third cross-sections of the sample, the percentages of the total cross-sectional areas of the liquid-phase domains were, respectively, 82%, 83% and 78%, based on the area of each cross-section of the sample. From these results, it was found that the volume percentage of the liquid-phase domains in the hybrid polymeric electrolyte was 81%. It was also found that any of the first, second and third cross-sections of the sample showed no liquid-phase domain connected to the original surface of the sheet.

The hybrid polymeric electrolyte was subjected to measurement of water permeability in the same manner as in Example 1. As a result, it was found that the hybrid polymeric electrolyte had no water permeability.

The amount of the non-aqueous electrolytic solution in the hybrid polymeric electrolyte was 88% by weight, as calculated from the weight difference between the foamed sheet (before the impregnation of the non-aqueous electrolytic solution) and the hybrid polymeric electrolyte.

When the hybrid polymeric electrolyte was subjected to measurement of a glass transition temperature by differential thermal analysis, it was found that it had a glass transition temperature of −102° C. Since it had previously been found that the foamed sheet (before the impregnation of the electrolytic solution) had a glass transition temperature of −51° C., it was confirmed that the continuous solid polymer matrix of the hybrid polymeric electrolyte was impregnated with the electrolytic solution.

The hybrid polymeric electrolyte sheet was sandwiched between two stainless steel sheets, thereby obtaining a laminate structure. In the same manner as in Example 1, the sandwiched hybrid polymeric electrolyte sheet was subjected to measurement of an alternating-current impedance, using two stainless steel sheets as electrodes. The ionic conductivity value was calculated from the real part of the complex impedance expressed in the form of a Cole-Cole plot. As a result, it was found that the ionic conductivity was $3.7 \times 10^{-3}$ S/cm.

EXAMPLE 12

The foamed sheet obtained in Example 10 was cut into a sample having a size of 5 cm×5 cm. The sample was placed in a mixture of 50 ml of tetrahydrofuran and 50 ml of a non-aqueous electrolytic solution obtained by dissolving lithium hexafluorophosphate ($LiPF_6$) in a mixed solvent of ethylene carbonate (EC) and propylene carbonate (PC) (EC/PC weight ratio=1/1, and $LiPF_6$ concentration: 1 mol/liter), and kept therein for 8 hours at 50° C. so as to impregnate the sample with the mixture of the tetrahydrofuran and the non-aqueous electrolytic solution, thereby obtaining a swollen transparent foamed sheet. Subsequently, the obtained swollen transparent foamed sheet was maintained at room temperature under a pressure of $10^{-3}$ Torr for 1 hour so as to remove the tetrahydrofuran, thereby obtaining a transparent sheet as a hybrid polymeric electrolyte. The obtained hybrid polymeric electrolyte sheet had a size of 5 cm×5 cm and a thickness of 255 μm.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain and each had a size of from 5 to 11 μm in terms of the average value of the long axis and short axis of each domain, were observed. In the first, second and third cross-sections of the sample, the percentages of the total cross-sectional areas of the liquid-phase domains were, respectively, 73%, 71% and 75%, based on the area of each cross-section of the sample. From these results, it was found that the volume percentage of the liquid-phase domains in the hybrid polymeric electrolyte was 72.7%. It was also found that any of the first, second and third cross-sections of the sample showed no liquid-phase domain connected to the original surface of the sheet.

The hybrid polymeric electrolyte was subjected to measurement of water permeability in the same manner as in Example 1. As a result, it was found that-the hybrid polymeric electrolyte had no water permeability.

The amount of the non-aqueous electrolytic solution in the hybrid polymeric electrolyte was 71% by weight, as calculated from the weight difference between the foamed sheet (before the impregnation of the non-aqueous electrolytic solution) and the hybrid polymeric electrolyte.

When the hybrid polymeric electrolyte was subjected to measurement of a glass transition temperature by differential thermal analysis, it was found that it had a glass transition temperature of −99° C. Since it had previously been found that the foamed sheet (before the impregnation of the electrolytic solution) had a glass transition temperature of −51° C., it was confirmed that the continuous solid polymer matrix of the hybrid polymeric electrolyte was impregnated with the electrolytic solution.

The hybrid polymeric electrolyte sheet was sandwiched between two stainless steel sheets, thereby obtaining a laminate structure. In the same manner as in Example 1, the sandwiched hybrid polymeric electrolyte sheet was subjected to measurement of an alternating-current impedance, using two stainless steel sheets as electrodes. The ionic conductivity value was calculated from the real part of the complex impedance expressed in the form of a Cole-Cole plot. As a result, it was found that the ionic conductivity was $1.0 \times 10^{-3}$ S/cm.

EXAMPLE 13

A hexafluoropropylene/vinylidene fluoride copolymer (hexafluoropropylene content: 5% by weight) was subjected to extrusion molding in substantially the same manner as in Example 10, thereby obtaining a molded sheet having a thickness of 25 μm. The obtained molded sheet was irradiated with electron beams so that the irradiation dose became 20 Mrads. The sheet was then immersed in a mixture of flon HFC134a and water in a vessel in substantially the same manner as in Example 1 so as to impregnate the sheet with the mixture of flon HFC134a and water (flon/water mixture content in the resultant impregnated sheet: 5% by weight). Subsequently, the sheet was taken out from the vessel and immediately heated at 180° C. (furnace temperature: 180° C.) for 5 seconds, thereby foaming the sheet to obtain a white foamed sheet having a thickness of 40 μm (expansion ratio: 4 times). The obtained foamed sheet contained closed cells having a diameter of from about 10 to about 15 μm. The volume percentage of the closed cells contained in the foamed sheet was 71%, based on the entire volume of foamed sheet, as measured by the air comparison pycnometer.

The foamed sheet was cut into a sample having a size of 5 cm×5 cm. The sample was placed in a mixture of 50 ml of acetone and 50 ml of a non-aqueous electrolytic solution obtained by dissolving lithium tetrafluoroborate ($LiBF_4$) in a mixed solvent of ethylene carbonate (EC) and propylene carbonate (PC) (EC/PC weight ratio=1/1, and $LiBF_4$ concentration: 1 mol/liter), and kept therein for 24 hours at 40° C. so as to impregnate the sample with the mixture of the tetrahydrofuran and the non-aqueous electrolytic solution, thereby obtaining a swollen transparent foamed sheet. Subsequently, in a flow of an argon gas, the obtained swollen transparent foamed sheet was maintained at room temperature under a pressure of $10^{-3}$ Torr for 30 minutes so as to remove the acetone, thereby obtaining a transparent sheet as a hybrid polymeric electrolyte. The obtained hybrid polymeric electrolyte sheet had a size of 5 cm×5 cm and a thickness of 41 μm.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain and each had a size of from 10 to 13 μm in terms of the average value of the long axis and short axis of each domain, were observed. In the first, second and third cross-sections of the sample, the percentages of the total cross-sectional areas of the liquid-phase domains were, respectively, 61%, 58% and 63%, based on the area of each cross-section of the sample. From these results, it was found that the volume percentage of the liquid-phase domains in the hybrid polymeric electrolyte was 60.7%. It was also found that any of the first, second and third cross-sections of the sample showed no liquid-phase domain connected to the original surface of the sheet.

The hybrid polymeric electrolyte was subjected to measurement of water permeability in the same manner as in Example 1. As a result, it was found that the hybrid polymeric electrolyte had no water permeability.

The amount of the non-aqueous electrolytic solution in the hybrid polymeric electrolyte was 69% by weight, as calculated from the weight difference between the foamed sheet (before the impregnation of the non-aqueous electrolytic solution) and the hybrid polymeric electrolyte.

When the hybrid polymeric electrolyte was subjected to measurement of a glass transition temperature by differential thermal analysis, it was found that it had a glass transition temperature of −98° C. Since it had previously been found that the foamed sheet (before the impregnation of the electrolytic solution) had a glass transition temperature of −51° C., it was confirmed that the continuous solid polymer matrix of the hybrid polymeric electrolyte was impregnated with the electrolytic solution.

The hybrid polymeric electrolyte sheet was sandwiched between two stainless steel sheets, thereby obtaining a laminate structure. In the same manner as in Example 1, the sandwiched hybrid polymeric electrolyte sheet was subjected to measurement of an alternating-current impedance, using two stainless steel sheets as electrodes. The ionic conductivity value was calculated from the real part of the complex impedance expressed in the form of a Cole-Cole plot. As a result, it was found that the ionic conductivity was $7 \times 10^{-4}$ S/cm.

EXAMPLE 14

Equimolar amounts of lithium hydroxide and cobalt oxide were mixed with each other, and the resultant mixture was heated at 750° C. for 5 hours, to thereby obtain powdery $LiCoO_2$ having an average particle diameter of 10 μm. The obtained powdery $LiCoO_2$ and carbon black were added to and dispersed in a 5% by weight solution of poly(vinylidene fluoride) (KF1100, manufactured and sold by Kureha Chemical Industry Co., Ltd., Japan) in NMP, so that a slurry containing solid components in the following weight ratio was obtained: $LiCoO_2$ (85%), carbon black (8%) and poly (vinylidene fluoride) (7%). The obtained slurry was applied onto an aluminum foil by doctor blade method and dried, to thereby obtain an $LiCoO_2$ sheet having a thickness of 110 μm. The obtained $LiCoO_2$ sheet was cut into a size of 2 cm×2 cm. On the other hand, the hybrid polymeric electrolyte sheet prepared in Example 2 was cut into a size of 2.5 cm×2.5 cm. Then, the cut $LiCoO_2$ sheet was covered with the cut hybrid polymeric electrolyte sheet. The hybrid polymeric electrolyte sheet was sandwiched between the $LiCoO_2$ sheet and a metallic lithium foil having a size of 2 cm×2 cm (thickness: 100 μm). Thus, a laminate structure composed of a positive electrode ($LiCoO_2$)/the hybrid polymeric electrolyte sheet/a negative electrode (metallic lithium) was obtained. Stainless steel sheets (as electric terminals for taking a current) were brought into contact with the respective current collectors of the positive and negative electrodes of the above-obtained laminate structure. The laminate structure was then placed in a sealable glass cell having inner electric terminals for taking a current from the laminate structure (hereinafter frequently referred to simply as "glass cell"), wherein the inner electric terminals of the glass cell are connected to outer electric terminals of the glass cell, and the electric terminals of the laminate structure were connected to the inner electric terminals of the cell. The cell was sealed in an argon atmosphere to obtain a battery.

The obtained battery was subjected to charge/discharge cycle testing (current density per surface area of the electrodes: 3 $mA/cm^2$), using a charging/discharging device (model 101SM6, manufactured and sold by Hokuto Denko Corporation, Japan). The charging operation was conducted at a constant potential of 4.2 V. After the charging operation, the potential between the electrodes of the battery was 4.2 V. Accordingly, it was confirmed that the battery was charged. The discharging operation was conducted at a constant current, and discontinued when the potential between the electrodes was decreased to 2.7 V. As a result of the charge/discharge cycle testing, it was found that the discharge/charge efficiency (ratio) of the first cycle was 85%, and that, with respect to the cycles after the first cycle, the discharge/charge efficiency (ratio) was 88% or more. These results show that this battery is capable of being repeatedly charged and discharged and hence operable as a secondary battery.

EXAMPLE 15

In substantially the same manner as in Example 3, powder of needle coke having an average diameter of 10 μm were mixed with a 5% by weight solution of polyvinylidene fluoride in NMP, to thereby obtain a slurry [needle coke/ polyvinylidene fluoride weight ratio (dry weight)=92/8]. The slurry was applied onto a copper sheet by using a doctor blade, to thereby obtain a film having a thickness of 120 μm. The obtained film was cut into a size of 2 cm×2 cm as a needle coke electrode. On the other hand, the hybrid polymeric electrolyte sheet obtained in Example 12 was cut into a size of 2.3 cm×2.3 cm. The cut hybrid polymeric electrolyte sheet was sandwiched between the needle coke electrode and the $LiCoO_2$ electrode obtained in Example 14, and the resultant structure was heated at 120° C., thereby obtaining a laminate structure of needle coke (negative electrode)/ hybrid polymeric electrolyte/$LiCoO_2$ (positive electrode).

The obtained laminate structure was placed in a glass cell having inner electric terminals for taking a current from the laminate structure, wherein the inner electric terminals of the glass cell are connected to outer electric terminals of the glass cell, and the electric terminals of the laminate structure were connected to the inner electric terminals of the cell. The glass cell was sealed, thereby obtaining a battery. The obtained battery was subjected to charge/discharge cycle testing in the same manner as in Example 6, except that the current density per surface area of the electrodes was changed to 3 mA/cm². As a result of the charge/discharge cycle testing, it was found that the discharge/charge efficiency (ratio) of the first cycle was 81%, and that, with respect to the cycles after the first cycle, the discharge/ charge efficiency (ratio) was 98% or more. These results show that this battery is capable of being repeatedly charged and discharged and hence operable as a second battery.

Comparative Example 3

The non-irradiated molded sheet of a hexafluoropropylene/vinylidene fluoride copolymer having a thickness of 150 μm, which had been prepared in Example 1, was cut into a size of 5 cm×5 cm. The cut copolymer sheet was placed in a mixture of 50 ml of acetone and 50 ml of a non-aqueous electrolytic solution obtained by dissolving lithium tetrafluoroborate ($LiBF_4$) in a mixed solvent of ethylene carbonate (EC) and propylene carbonate (PC) (EC/PC weight ratio=1/1, and $LiBF_4$ concentration: 1 mol/ liter), and kept therein for 24 hours at room temperature so as to impregnate the cut copolymer sheet with the mixture of the acetone and the non-aqueous electrolytic solution, thereby obtaining a swollen sheet. The obtained swollen sheet was maintained at 15° C. under a pressure of $10^{-3}$ Torr for 30 minutes so as to remove the acetone, thereby obtaining a polymeric electrolyte sheet. The obtained polymeric electrolyte sheet had a thickness of 160 μm and a size of 5.2 cm×5.2 cm.

The sheet was sandwiched between two stainless steel sheets, thereby obtaining a laminate structure. The sandwiched sheet was subjected to measurement of an alternating-current impedance, using two stainless steel sheets as electrodes. The ionic conductivity of the laminate structure was calculated from the real part of the complex impedance expressed in the form of a Cole-Cole plot. As a result, it was found that the ionic conductivity was $4.1 \times 10^{-6}$ S/cm.

Comparative Example 4

1.5 g of a powder of hexafluoropropylene/vinylidene fluoride copolymer (hexafluoropropylene content: 12% by weight) was mixed with a mixture of 10 ml of acetone and 5 g of a non-aqueous electrolytic solution obtained by dissolving lithium tetrafluoroborate ($LiBF_4$) in a mixed solvent of ethylene carbonate (EC) and propylene carbonate (PC) (EC/PC weight ratio=1/1, and $LiBF_4$ concentration: 1 mol/liter), and the whole was allowed to stand at 40° C. for 24 hours to thereby obtain a homogeneous solution. The obtained homogeneous solution was cast on a stainless sheet and kept thereon in a flow of argon gas for 10 minutes so as to evaporate the acetone, thereby obtaining a film. Further, the film was maintained on the stainless sheet at room temperature under a pressure of $10^{-3}$ Torr for 30 minutes. The resultant film had a thickness of about 250 μm. The film was very flexible and easily distorted, so that it was impossible to measure the thickness of the film accurately.

The amount of the non-aqueous electrolytic solution contained in the film was 63% by weight, as determined by thermogravimetric analysis.

While keeping the film on the stainless sheet, another stainless sheet was pressed against the exposed surface of the film, thereby obtaining a laminate structure in which the film was sandwiched between the two stainless sheets. The sandwiched film was subjected to measurement of an alternating-current impedance, using two stainless sheets as electrodes. As a result, a short circuiting occurred between the stainless sheets, so that it was impossible to measure the alternating-current impedance.

EXAMPLE 16

A 10% by weight solution of polyethylene oxide (viscosity average molecular weight: 1,000,000, manufactured an sold by Aldrich, U.S.A.) in methylene chloride was cast onto a glass plate, thereby obtaining a cast sheet having a thickness of 160 μm. The obtained sheet was irradiated with electron beams so that the irradiation dose became 15 Mrads. The sheet was immersed in a mixture of flon HFC-134 and water in a vessel in substantially the same manner as in Example 1 so as to impregnate the sheet with the mixture of flon HFC-134a and water. Subsequently, the sheet was taken out from the vessel and immediately heated at 100° C. (furnace temperature: 100° C.) for 20 seconds, thereby foaming the sheet to obtain a foamed sheet having a thickness of 220 μm. The volume percentage of the closed cells contained in the foamed sheet was 63%.

The foamed sheet was placed in a non-aqueous electrolytic solution obtained by dissolving $LiPF_6$ in a mixed solvent of ethylene carbonate (EC) and propylene carbonate (PC) (EC/PC weight ratio=1/1, and $LiPF_6$ concentration: 1 mol/liter), and kept therein for 3 hours at 60° C. so as to impregnate the foamed sheet with the non-aqueous electrolytic solution, thereby obtaining a swollen foamed sheet as a hybrid polymeric electrolyte.

The amount of the non-aqueous electrolytic solution in the hybrid polymeric electrolyte was 70% by weight, as calculated from the weight difference between the foamed sheet (before the impregnation of the non-aqueous electrolytic solution) and the hybrid polymeric electrolyte.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain, and each had a size of from 25 to 40 µm in terms of the average value of the long axis and short axis of each domain, were observed. In the first, second and third cross-sections of the sample, the percentages of the total cross-sectional areas of the liquid-phase domains were, respectively, 33%, 25% and 35%, based on the area of each cross-section of the sample. From the results, it was found that the volume percentage of the liquid-phase domains in the hybrid polymeric electrolyte was 31%. It was also found that any of the first, second and third cross-sections of the sample showed no liquid-phase domain communicating with the original surface of the sheet.

A sample of hybrid-polymeric electrolyte was sandwiched between a stainless-steel sheet and metallic lithium sheets in substantially the same manner as in Example 1. The oxidation-reduction stability of the hybrid polymeric electrolyte was evaluated by cyclic voltammetry over a sweep potential range of from 0 to 5 V. As a result, it was found that, due to reduction, current peaks were observed at the potential of 1.2 V (at which the current peak was 1.9 times as high as the background current) and at the potential of 0.7 V (the current peak was twice as high as the background current). It was also found that, due to oxidation, the current was increased in the potential range of 4.2 V or higher (the current at the potential of 4.2 V was twice as high as the background current). The results indicate that the hybrid polymeric electrolyte is electrochemically stable over the potential range of from 0.7 to 4.2 V.

The sample of the hybrid polymeric electrolyte sheet was sandwiched between two stainless steel sheets, and subjected to measurement of an alternating current impedance. As a result, it was found that the ionic conductivity was $1.8 \times 10^{-3}$ S/cm.

EXAMPLE 17

A 10% by weight solution of acrylonitrile-styrene copolymer (acrylnitrile content: 45 mol %) in methylene chloride was cast onto a glass plate, thereby obtaining a sheet having a thickness of 120 µm. The obtained sheet was irradiated with electron beams so that the irradiation dose became 15 Mrads. The sheet was immersed in a mixture of flon HFC-134a and water (flon/water mixture content in the resultant impregnated sheet: 7% by weight) in a vessel in substantially the same manner as in Example 1 so as to impregnate the sheet with flon HFC-134a and water. Subsequently, the sheet was taken out from the vessel and immediately heated (furnace temperature: 150° C.) for 20 seconds, thereby foaming the sheet to obtain a foamed sheet having a thickness of 180 µm. The volume percentage of the closed cells contained in the foamed sheet was 68%.

The foamed sheet was placed in a non-aqueous electrolytic solution obtained by dissolving $LiPF_6$ in a mixed solvent composed of ethylene carbonate (EC) and propylene carbonate (PC) (EC/PC weight ratio=1:1, and LIPF6 concentration: 1 mol/liter), and kept therein for 3 hours at 60° C. so as to impregnate the foamed sheet with the non-aqueous electrolytic solution, thereby obtaining a swollen foamed sheet as a hybrid polymeric electrolyte.

The amount of the non-aqueous electrolytic solution in the hybrid polymeric electrolyte was 86% by weight, as calculated from the weight difference between the foamed sheet (before the impregnation of the non-aqueous electrolytic solution) and the hybrid polymeric electrolyte.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain, and each had a size of from 30 to 45 µm in terms of the average value of the long axis and short axis of each domain, were observed. In the first, second and third cross-sections of the sample, the percentages of the total cross-sectional areas of the liquid-phase domains were, respectively, 63%, 52% and 65%, based on the area of each cross-section of the sample. From the results, it was found that the volume percentage of the liquid-phase domains of the hybrid polymeric electrolyte was 60%. It was also found that any of the first, second and third cross-sections of the sample showed no liquid-phase domain communicating with the original surface of the sheet. Subsequently, the hybrid polymeric electrolyte was subjected to measurement of water permeability in the same maner as in Example 1. As a result, it was found that the hybrid polymeric electrolyte had no water permeability.

A sample of hybrid-polymeric electrolyte was sandwiched between a stainless-steel sheet and metallic lithium sheets in substantially the same manner as in Example 1. The oxidation-reduction stability of the hybrid polymeric electrolyte was evaluated by cyclic voltammetry over a sweep potential range of from 0 to 5 V. As a result, it was found that, due to reduction, the current was increased in the potentail range of lower than 0.6 V (the current at the potential of 0.6 V was twice as high as the background current). It was also found that, due to oxidation, the current was increased in the potentail range of 4.6 V or higher (the current at the potential of 4.6 V was twice as high as the background current). This indicates that the hybrid polymeric electrolyte is electrochemically stable over the potentail range of from 0.6 to 4.6 V.

The sample of the hybrid polymeric electrolyte sheet was sandwiched between two stainless steel sheets, and subjected to measurement of an alternatingcurrent impedance. As a result, it was found that the ionic conductivity was $1.8 \times 10^{-3}$ S/cm.

Comparative Example 5

A polystyrene sheet having a thickness of 100 µm was brought into contact with sulfuric acid anhydride gas at room temperature for 3 hours using vacuum-line, to thereby effect sulfonation of the polystyrene sheet. The increase in weight of the sulfonated polystyrene sheet was 64% by weight, as calculated from the weight difference between the polystyrene sheet before and after sulfonation (This indicates that 0.85 sulfonic acid group was introduced per styrene unit). After immersing the sulfonated polystyrene sheet in propylene carbonate, the sheet was sandwiched between two stainless steel sheets, and subjected to measurement of an alternating-current impedance. The measurement was difficult due to high impedance (ionic conductivity was below $10^{-8}$ S/cm). The sulfonated polystyrene sheet was immersed in a 1 mol/liter non-aqueous electrolytic solution of $LiBF_4$ in polypropylene carbonate, and the ionic conductivity was measured in substantially the same manner as mentioned-above. As a result, the ionic conductivity was $4 \times 10^{-7}$ S/cm.

Only a small change in weight of the sulfonated polystyrene sheet was observed after immersing the sheet in the non-aqueous electrolytic solution, and the content of the non-aqueous electrolytic solution in the sheet, as calculated from the weight increase of the sheet, was 2% by weight.

A sample of the sulfonated polystyrene sheet was sandwiched between a stainless-steel sheet and a metallic lithium sheet in substantially the same manner as in Example 1. The oxidation-reduction stability of the obtained hybrid polymeric electrolyte was evaluated by cyclic voltammeter over a sweep potential range of from 0 to 5 V. As a result, it was found that, due to reduction, current peaks were observed at the potentials of 2.3 V and 1.5 V (at which the current peaks were 3 or more times as high as the background current). It was also found that, due to oxidation, the current was in a potential range of 2.9 V or higher (the current at the potential of 2.9 V was twice as high as the background current, and the current at a potential of higher than 2.9 V increased more). The results indicate that the sulfonated polystyrene is electrochemically stable only over the potential range as narrow as from 2.3 to 2.9 V.

Comparative Example 6

100 ml of a 10% by weight solution of polyurethane (a polymer having an average molecular weight of 11,000, prepared by reacting ethylene glycol having a molecular weight of 600 and hexamethylene diisocyanate) in toluene was cast onto a glass plate, thereby obtaining a sheet having a thickness of 80 $\mu$m. The sheet was sandwiched between the stainless-steel sheets and immersed in a 1 mol/liter non-aqueous electrolytic solution of $LiBF_4$ in propylene carbonate in a glass cell. The resultant sheet was subjected to the potential sweep by cyclic voltammetry (reference electrode: metallic lithium) in the glass cell over a sweep potential range of from 0 to 5 V. As a result, it was found that, due to reduction, a plurality of current peaks were observed in the potential range of from 0 to 2 V (at 1.8 V, the current peak was 3 times as high as the background current, at 1.5 V, the current peak was 5 times as high as the background current and at 1.2 V, the current peak was 3 times as high as the background current), and in the potential range of less than 0.9 V, due to reduction, the current was increased (the current at the potential of 0.9 V was twice as high as the background current). It was also found that, in the range of from 3 to 5 V, due to oxidation, the current peak is observed at the potential of 3.1 V (at which the current was twice as high as the background current) and the current was increased in the potential range of 4.1 V or higher (the current at the potential of 4.1 V is twice as high as the background current). This indicates that a redox reaction is likely to occur in the case of a hybrid polymeric electrolyte prepared using polyurethane, so that this hybrid polymericelectrolyte is electrochemically unstable (The electrochemically stable electrochemical window is of from 1.85 V to 3.1 V). On the other hand, when a polyfluorovinylidene sheet (thickness: 90 $\mu$m) was irradiated in substantially the same manner (irradiation dose: 10 Mrads) and oxidation-reduction stability was evaluated in the same manner as mentioned above. As a result, it was found that no current peak due to oxidation or reduction was observed in the potential range of from 0.7 to 5 V.

EXAMPLE 18

A powder of vinylidenefluoride/hexafluoropropylene copolymer (hexafluoropropylene content: 5% by weight) was dissolved in NMP, thereby obtaining a 15% by weight solution of solid polymer. The above-mentioned NMP solution of polyvinylidene was added to a powder of needle coke, thereby obtaining a slurry [mixing ratio in dry weight: needle coke (85%):polymer (15%)]. The obtained slurry was applied onto a metallic copper sheet (thickness: 15 $\mu$m) according to doctor blade method, thereby obtaining a film (electrode layer) having a thickness of 120 $\mu$m. The volume percentage of the closed cells contained in the film was 30%, based on the volume of the copolymer component, and the volume percantage of the solid components was 70%. The film was pressed under heat, thereby obtaining a film having a thickness of 105 $\mu$m (the volume percentage of closed cell: 20%). The obtained sheet was irradiated with electron beams so that the irradiation dose became 10 Mrads. The sheet was immersed in a mixture of flon HFC-134a and water in a vessel in substantially the same manner as in Example 1 so as to impregnate the sheet with flon HFC-134a and water (flon/water mixture content in the resultant impregnated sheet: 10% by weight). Subsequently, the sheet was taken out from the vessel and immediately heated at 180° C. (furnace temperature: 180° C.) for 10 seconds, thereby foaming the sheet to obtain an electrode sheet having a thickness of 120 $\mu$m. The expansion ratio of the polymer was approximately 2 times, and the volume percentage of the closed cells contained in the electrode sheet was 50%, based on the entire volume of the foamed polymer.

EXAMPLE 19

A mixture of lithium hydroxide and cobalt oxide in equimolar amounts was heated at 750° C. for 5 hours, thereby obtaining $LiCoO_2$ powder having an average particle diameter of 10 $\mu$m. The obtained powder and carbon black were dispersed in a 10% by weight solution of polyvinyldenefluoride (KF1100, Kureha Chemical Industry Co. Ltd., Japan) in NMP, so that the obtained slurry had a solid composition of 80% $LiCoO_2$, 8% carbon black and 12% polymer. The obtained slurry was applied onto an aluminum foil (thickness: 15 $\mu$m) according to doctor blade method, thereby obtaining a film having a thickness of 110 $\mu$m. The volume percentage of closed cells contained in the film was 33%, based on the entire volume of the polymer, and the volume percentage of solid components of the obtained film was 67%. The film was subjected to roll pressing under heat, thereby obtaining a film having a thickness of 103 $\mu$m, (the volume percentage of closed cell: 28%). The obtained sheet was irradiated with electron beams so that the irradiation dose became 10 Mrads. The sheet was immersed in a mixture of flon HFC-134a and water in vessel in substantially the same manner as in Example 1, so as to impregnate the sheet with flon HFC-134a and water (flon/water mixture content in the resultant impregnated sheet: 10% by weight). Substantially, the sheet was taken out from the vessel and immediately heated at 180° C. (furnace temperature: 180° C.) for 10 seconds, thereby foaming the sheet to obtain an electrode sheet having a thickness of 121 $\mu$m. The expansion ratio of the polymer was approximately 2 times, and the volume percentage of the closed cells contained in the electrode sheet was 50%, based on the entire volume of the foamed polymer.

EXAMPLE 20

A polyvinylidene fluoride powder (KF1100, average particle diameter: 200 $\mu$m, manufactured and sold by Kureha Kagaku Kogyo Co., Ltd., Japan) was immersed in a mixture of flon HFC134a and water in a vessel in substantially the same manner as in Example 1 so as to impregnate the powder with the mixture of flon HFC134a and water (flon/water mixture content in the resultant impregnated powder: 10% by weight). Subsequently, the powder was taken out from the vessel and immediately heated at 180° C. (furnace temperature: 200° C.) for 1 minute, thereby foaming the powder to obtain a foamed particle having an average particle diameter of 300 µm (expansion ratio: 3.4 times). The volume percentage of the closed cells in the foamed particle was 70%. The foamed particle was frozen with liquid nitrogen, and ground and classified, to thereby obtain a powder having an average particle diameter of 30 µm. The volume percentage of the closed cells in the obtained powder was not less than 70%.

The powder was mixed with a graphite powder in a weight ratio of 15:85, and the resultant mixture was subjected to press molding to obtain a molded article. The obtained molded article was sintered at 180° C. without removing the molded article from the mold. Thus, a sintered molded article was obtained. Then, a sheet having a thickness of 150 µm was obtained by cutting off the above-obtained sintered molded article by means of a cutter. The obtained sheet and a metallic copper sheet (thickness: 15 µm) were pressed against each other while heating, to thereby obtain an electrode sheet. The volume percentage of the closed cells contained in the sintered molded sheet was 90%, based on the entire volume of the sintered molded sheet.

EXAMPLE 21

In substantially the same manner as in Example 20, a mixture of the powder obtained in Example 20 (12% by weight), an $LiCoO_2$ powder used in Example 19 (80% by weight) and a carbon black powder (8% by weight) was subjected to press molding and sintering, to obtain a sintered molded article. Then, a sheet having a thickness of 100 µm was obtained by cutting off the sintered molded article by means of a cutter. The obtained sheet and a metallic aluminium sheet (thickness: 15 µm) were pressed against each other while heating, to thereby obtain an electrode sheet. The volume percentage of the closed cells contained in the sintered molded sheet was 90%, based on the entire volume of the sintered molded sheet.

EXAMPLE 22

The electrode sheets prepared in Examples 18 and 19 were individually placed in a non-aqueous electrolytic solution obtained by dissolving lithium tetrafluoroborate ($LiBF_4$) in a mixed solvent composed of ethylene carbonate (EC), propylene carbonate (PC) and γ-butyrolactone (γ-BL) (EC/PC/γ-BL weight ratio 1/1/2, and $LiBF_4$ concentration: 1 mol/liter), and kept therein for 30 minutes at 100° C. so as to impregnate the sheets with a non-aqueous electrolytic solution. Then, the electrode sheet (as a positive electrode) which was prepared in Example 19 and impregnated with the electrolytic solution as mentioned above, the hybrid polymeric electrolyte prepared in Example 1, and the electrode sheet (as a negatie electrode) prepared in Example 18 and impregnated with the electrolytic solution as mentioned above were laminated in this order to thereby obtain a laminate structure.

Stainless steel sheets (as electric terminals for taking a current) were brought into contact with the respective current collectors of the positive and negative electrodes of the above-obtained laminate structure. The laminate structure was then placed in a glass cell having inner electric terminals for taking a current from the the laminate structure, wherein the inner electric terminals of the glass cell are connected to outer electric terminals of the glass cell, and the electric terminals of the laminate structure were connected to the inner electric terminals of the cell. The glass cell was sealed in an argon atmosphere to obtain a battery.

The obtained battery was subjected to charge/discharge cycle testing using a charge/discharge testing device (model 101SM6, manufactured and sold by Hokuto Denko Corporation, Japan) (current density per surface area of the electrodes: 1 mA/cm$^2$). The charging operation was carried out at a constant potential of 4.2 V. After the charging operation, the potential between the electrodes of the battery was 4.2 V. Accordingly, it was confirmed that the battery was charged. The discharging operation was carried out at a constant current, and discontinued when the potential between the electrodes was decreased to 2.7 V. As a result of the charge/discharge cycle testing, it was found that the discharge amount of the first discharge was 210 mAh/g of the carbon in the negative electrode. It was also found that the discharge amount of the 100th cycle was 179 mAh/g of the carbon in the negative electrode. These results show that this battery is capable of being repeatedly charged and discharged and hence operable as a secondary battery.

EXAMPLE 23

A microporous polyethylene membrane (Hipore U2 film, manufactured and sold by Asahi Chemical Industry Co., Ltd., Japan) was sandwiched between the electrode sheet prepared in Example 21 (as a positive electrode) and the electrode sheet prepared in Example 20 (as a negative electrode), to obtain a laminate structure. The laminate structure was placed in a non-aqueous electrolytic solution obtained by dissolving lithium hexafluorophosphate ($LiPF_6$) in a mixed solvent composed of ethylene carbonate (EC)/methyl ethyl carbonate (MEC) (EC/MEC weight ratio=1/2, and $LiPF_6$ concentration: 1.5 mol/liter), and kept therein for 30 minutes at 70° C. so as to impregnate the laminate structure with the non-aqueous electrolytic solution.

Stainless steel sheets were brought into contact with the respective current collectors of the positive and negative electrodes of the above-obtained laminate structure. The laminate structure was then placed in a glass cell having inner electric terminals for taking a current from the laminate structure, wherein the inner electric terminals of the glass cell are connected to outer electric terminals of the glass cell, and the electric terminals of the laminate structure were connected to the inner electric terminals of the cell. The glass cell was sealed in an argon atmosphere to obtain a battery.

The obtained battery was subjected to charge/discharge cycle testing using charger/discharger testing device (model 101SM6, manufactured and sold by Hokuto Denko Corporation, Japan) (current density per surface area of the electrodes: 1 mA/cm$^2$). The charging operation was carried out at a constant potential of 4.2 V. After the charging operation, the potential between the electrodes of the battery was 4.2 V. Accordingly, it was confirmed that the battery was charged. The discharging operation was carried out at a constant current, and discontinued when the potential between the electrodes was decreased to 2.7 V. As a result of the charge/discharge cycle testing, it was found that the discharge amount of the first discharge was 310 mAh/g of the carbon in the negative electrode. It was also found that the discharge amount of the 100th cycle was 253 mAh/g of the carbon in the negative electrode. These results show that this battery is capable of being repeatedly charged and discharged and hence operable as a secondary battery.

51

Comparative Example 7

A microporous polyethylene film (Hipore U2 film, manufactured and sold by Asahi Chemical Industry Co., Ltd., Japan) was sandwiched between the electrode sheet prepared in Example 19 (as a positive electrode) and the electrode sheet prepared in Example 18 as a negative electrode), to obtain a laminate structure.

The obtained laminate structure was placed in the same non-aqueous electrolytic solution as used in Example 22 [that is, a solution obtained by dissolving lithium tetrafluoroborate($LiBF_4$) in a mixed solvent composed of ethylene carbonate(EC), propylene carbonate(PC) and γ-butyrolactone(γ-BL) (EC/PC/γ-BL weight retio=1/1/2, and $LiBF_4$ concentration: 1 mol/liter], and kept threin for 2 hours at 100° C. so as to impregnate the laminate structure with the electrolytic solution.

Using the impregnated laminate structure, a battery was constructed in substantially the same manner as in Example 22. Illustratively stated, two stainless steel sheets were brought into contact with the respective current collectors of the positive and negative electrodes of the above-obtained impregnated laminate structure. The laminate structure was then placed in a glass cell having inner electric terminals for taking a current from the laminate structure, wherein the inner electric terminals of the glass cell are connected to outer electric terminals of the glass cell, and the electric terminals of the laminate structure were connected to the inner electric terminals of the cell. The glass cell was sealed in an argon atmosphere to obtain a battery.

The obtained battery was subjected to charge/discharge cycle testing using a charge/discharge testing device (model 101SM6, manufactured and sold by Hokuto Denko Co., Corporation, Japan) (current density per surface area of the electrodes: 1 mA/cm2). The charging operation was carried out at a constant potential of 4.2 V. After the charging operation, the potential between the electrodes of the battery was 4.2 V. Accordingly, it was confirmed that the battery was charged. The discharging operation was carried out at a constant current, and discontinued when the potential between the electrodes was decreased to 2.7 V. As a result of the charge/discharge cycle testing, it was found that the discharge amount of the first discharge was 190 mAh/g of the carbon in the negative electrode. It was also found that the discharge capacity of the 100th cycle was 125 mAh/g of the carbon in the negative electrode.

Comparative Example 8

A 10% by weight solution of a polyvinylidene fluoride powder used in Example 20 in NMP was mixed with a graphite powder in the same weight ratio as employed in Example 20 to obtain a slurry. The obtained slurry was applied uniformly onto a metallic copper sheet (thickness: 15 μm) and dried, to thereby obtain a negative electrode sheet.

A solution of a polyvinylidene fluoride in NMP, a carbon black powder and an $LiCoO_2$ powder were mixed with each other in the same weight ratio as employed in Example 21, to obtain a slurry. The obtained slurry was applied uniformly onto a metallic aluminium sheet (thickness: 15 μm) and dried, to thereby obtain a positive electrode sheet.

A laminate structure was constructed in substantially the same manner as in Example 23, using a microporous film of polyethylene (Hipore U2 film, manufactured and sold by Asahi Chemical Industry Co., Ltd., Japan) and the above-obtained positive and negative electrode sheets. The obtained laminate structure was placed in a non-aqueous electrolytic solution obtained by dissolving lithium hexafluorophosphate ($LiPF_6$) in a mixed solvent composed of ethylene carbonate (EC) and methyl ethyl carbonate (MEC) (EC/MEC weight retio=1/2, and $LiPF_6$ concentration: 1.5 mol/liter), and kept therein for 30 minutes at 70° C. so as to impregnate the laminate structure with the non-aqueous electrolytic solution.

Stainless steel sheets were brought into contact with the respective current collectors of the positive and negative electrodes of the impregnated laminate structure. The laminate structure was then placed in a glass cell having inner electric terminals for taking a current from the laminate structure, wherein the inner electric terminals of the glass cell are connected to outer electric terminals of the glass cell, and the electric terminals of the laminate structure were connected to the inner electric terminals of the cell. The glass cell was sealed in an argon atmosphere to obtain a battery.

The obtained battery was subjected to charge/discharge cycle testing using a charge/discharge testing device (model 101SM6, manufactured and sold-by Hokuto Denko Corporation, Japan) (current density per surface area of the electrodes: 1 mA/cm$^2$). The charging operation was carried out at a constant potential of 4.2 V. After the charging operation, the potential between the electrodes of the battery was 4.2 V. Accordingly, it was confirmed that the battery was charged. The discharging operation was carried out at a constant current, and discontinued when the potential between the electrodes was decreased to 2.7 V. As a result of the charge/discharge cycle testing, it was found that the discharge capacity of the first discharge was 244 mAh/g of the carbon in the negative electrode. It was also found that the discharge capacity of the 100th cycle was 165 mAh/g of the carbon in the negative electrode.

EXAMPLE 24

A laminate structure was obtained in substantially the same manner as in Example 23, except that the nonimpregnated foamed sheet prepared in Example 2 was used instead of the polyethylene microporous membrane, to thereby obtain a laminate sturucture. The obtained laminate structure was placed in the same non-aqueous electrlytic solution as used in Example 23, and kept therein for 2 hours at 70° C. so as to impregnate the laminate structure with the non-aqueous electrolytic solution.

A battery was obtained in substantially the same manner as in Example 23. The obtained battery was subjected to charge/discharge cycle testing (current density: 1 mA/cm$^2$). The charging operation was carried out at a constant potential of 4.2 V. After the charging operation, the potential between the electrodes of the battery was 4.2 V. Accordingly, it was confirmed that the battery was charged. The discharging operation was carried out at a constant current, and discontinued when the potential between the electrodes was decreased to 2.7 V. As a result of the charge/discharge cycle testing, it was found that the discharge amount of the first discharge was 312 mA/g of the carbon in the negative electrode. It was also found that the discharge amount of the 100th cycle was 268 mA/g. These results show that this battery is capable of being repeatedly charged and discahrged and hence operable as a secondary battery.

Comparative Example 9

A membrane filter (trade name: Durapore HVHP, manufactured and sold by Millipore Corporation, U.S.A.) was impregnated with a non-aqueous electrolytic solution obtained by dissolving $LiBF_4$ in a mixed solvent of ethylene carbonate (EC), propylene carbonate (PC) and γ-butyrolactone (γ-BL) (EC/PC/γ-BL weight ratio=1/1/2, and $LiBF_4$ concentration: 1 mol/liter). The ionic conductivity of the impregnated filter was measured in the same manner as in Example 1. As a result, it was found that the ionic conductivity was $0.8\times10^{-4}$ S/cm.

A sample for observing cross-sections was obtained in substantially the same manner as in Example 1, and each of the first, second and third cross-sections of the sample was examined. As a result, it was found that, in each of the first, second and third cross-sections of the sample, there were many open cells communicating with the original surface of the filter, from which the electrolytic solution had effused.

The impregnated filter was subjected to measurement of water permeability in the same manner as in Example 1. As a result, it was found that the water permeability of the impregnated filter was 16,000 liters/$m^2$·hr·atm. Before the impregnation of the non-aqueous electroytic solution, the water permeability of the filter was 15,000 liters/$m^2$·hr·atm.

The volume percentage of the closed cells contained in the filter before the impregnation of the non-aqueous electrolytic solution was 0%, based on the entire volume of the filter.

The above results show that the filter is a porous membrane having open cells and through-holes, and that, when the filter is impregnated with a non-aqueous electrolytic solution, the electroytic solution effuses from the filter.

EXAMPLE 25

A hexafluoropropylene/vinylidene fluoride copolymer resin (hexafluoropropylene content: 5% by weight) was subjected to extrusion molding in substantially the same manner as in Example 1, thereby obtaining a molded sheet having a thickness of 150 μm. The obtained molded sheet was irradiated with electron beams so that the irradiation dose became 5 Mrads. Then, the irradiated sheet was subjected to vacuum drying at 60° C., while removing HF gas generated by drying. The sheet was then immersed in a mixture of flon HFC134a and water (flon/water weight ratio: 49/1) and the whole was allowed to stand at 70° C. so as to impregnate the sheet with the mixture of flon HFC134a and water (flon/water mixture content in the resultant impregnated sheet: 9% by weight). Subsequently, the sheet was taken out from the vessel and immediately heated at 170° C. by means of a furnace for 1 minute, thereby foaming the sheet to obtain a white foamed sheet having a thickness of 165 μm (expansion ratio: 5 1.3 times). The volume percentage of the closed cells contained in the foamed sheet was 21.3%, based on the entire volume of the foamed sheet.

The sheet was then immersed in NMP in a vessel and the whole was heated at 90° C. for 3 hours. Subsequently, the sheet was taken out from the vessel and washed with acetone, thereby obtaining a dried sheet. The weight of the dried sheet was measured, and from the weight of the dried sheet, the weight percentage of the crosslinked polymer segment produced by irradiation of electron beams was measured, and found to be 23%, based on the weight of the sheet prior to the impregnation with NMP.

The sheet was placed in the same non-aqueous electrolytic solution as used in Example 1 (EC/PC/γ-BL weight ratio=1/1/2, and $LiBF_4$ concentration: 1 mol/liter), and kept therein for 2 hours at 100° C. so as to impregnate the foamed sheet with the non-aqueous electrolytic solution, thereby obtaining a swollen foamed sheet as a hybrid polymeric electrolyte. The amount of the non-aqueous electrolytic solution in the hybrid polymeric electrolyte was 36% by weight, as calculated from the weight difference between the foamed sheet (prior to the impregnation of the non-aqueous electrolytic solution) and the hybrid polymeric electrolyte.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain and each had a size of from 2 to 4 μm in terms of the average value of the long axis and short axis of each domain, were observed. Most of the above-mentioned circular cross-sections of liquid-phase domains had a size of about 3 μm. In the first, second and third cross-sections of the sample, the percentages of the total cross-sectional areas of the liquid-phase domains were, respectively, 12%, 10% and 15%, based on the area of each cross-section of the sample. From these results, it was found that the volume percentage of the liquid-phase domains in the hybrid polymeric electrolyte was 12.3%.

In the same manner as in Example 1, the ionic conductivity value of the hybrid polymeric electrolyte was calculated and, as a result, it was found that the ionic conductivity was $2.1\times10^{-4}$ S/cm.

EXAMPLE 26

The foamed sheet which had been prepared and irradiated with electron beams (irradiation dose: 15 Mrads) in Example 4 was further irradiated with electron beams so that the irradiation dose became 15 Mrads. The sheet was then immersed in NMP in a vessel and the whole was heated at 90° C. for 3 hours. Subsequently, the sheet was taken out from the vessel and washed with acetone, thereby obtaining a dried sheet. The weight of the dried sheet was measured, and from the weight of the dried sheet, the weight percentage of the crosslinked polymer segment produced by the irradiation of electron beams was measured, and found to be 75%, based on the weight of the sheet before the impregnation with NMP.

The sheet was placed in the same non-aqueous electrolytic solution as used in Example 4 (EC/PC/γ-BL weight ratio=1/1/2, and $LiBF_4$ concentration: 1.5 mol/liter), and kept therein for 2 hours at 100° C. so as to impregnate the foamed sheet with the non-aqueous electrolytic solution, thereby obtaining a swollen foamed sheet as a hybrid polymeric electrolyte. The amount of the non-aqueous electrolytic solution in the hybrid polymeric electrolyte was 72% by weight, as calculated from the weight difference between the foamed sheet (prior to the impregnation of the non-aqueous electrolytic solution) and the hybrid polymeric electrolyte.

A sample for observing cross-sections was obtained from the hybrid polymeric electrolyte sheet in substantially the same manner as in Example 1, and each of the first, second and third cross-sections of the sample was examined. As a result, in the first, second and third cross-sections of the sample, circular cross-sections of liquid-phase domains, which were uniformly dispersed in the continuous solid-phase domain and each had a size of from 2 to 12 μm in terms of the average value of the long axis and short axis of each domain, were observed. In the first, second and third cross-sections of the sample, the percentages of the total cross-sectional areas of the liquid-phase domains were, respectively, 48%, 54% and 50%, based on the area of each cross-section of the sample. From these results, it was found that the volume percentage of the liquid-phase domains in the hybrid polymeric electrolyte was 51.3%.

In the same manner as in Example 4, the ionic conductivity value of the hybrid polymeric electrolyte was calculated and, as a result, it was found that the ionic conductivity was $2.9 \times 10^{-3}$ S/cm.

INDUSTRIAL APPLICABILITY

The hybrid polymeric electrolyte of the present invention has not only high ionic conductivity, high mechanical strength, excellent flexibility and excellent processability, but also has the ability to prevent the non-aqueous electrolytic liquid from leakage, so that the electrolyte of the present invention can be advantageously used in various non-aqueous electrochemical devices such as a lithium battery, a lithium secondary battery, a photoelectrochemical battery, an electrochemical sensor and an electrical double layer capacitor. The non-aqueous electrochemical device comprising the hybrid polymeric electrolyte of the present invention exhibits not only excellent electrochemical performance, but also has high ability to retain an electrolytic liquid therein, so that the electrochemical device has excellent safety and is highly reliable in practical use thereof.

What is claimed is:

1. A hybrid polymeric electrolyte formed of a closed-cell cellular polymer foam impregnated with an electrolytic liquid, comprising:
    a plurality of closed cells defined by cell walls constituting a continuous solid-phase domain for said hybrid polymeric electrolyte,
    said continuous solid-phase domain comprising a continuous solid polymer matrix impregnated with a non-aqueous electrolytic liquid,
    each of said plurality of closed cells being substantially filled with said non-aqueous electrolytic liquid to form a plurality of liquid-phase domains for said hybrid polymeric electrolyte which are dispersed in said continuous solid-phase domain;
    wherein said continuous solid polymer matrix comprises a crosslinked polymer segment and a non-crosslinked polymer segment, and wherein the weight ratio of the crosslinked polymer segment to the total weight of the crosslinked polymer segment and the non-crosslinked polymer segment is in the range of from 0.2 to 0.8.

2. The hybrid polymeric electrolyte according to claim 1, wherein said plurality of liquid-phase domains comprise major liquid-phase domains each having a size of 2 $\mu$m or more in terms of the average value of the long axis and short axis of each liquid-phase domain, said major liquid-phase domains being present in an amount of from 5 to 95% by volume, based on the entire volume of said hybrid polymeric electrolyte, and wherein said major liquid-phase domains contain effective liquid-phase domains having a size of from 2 to 50 $\mu$m in terms of the average value as defined above, said effective liquid-phase domains being present in an amount of 60% or more by volume, based on the total volume of said major liquid-phase domains.

3. The hybrid polymeric electrolyte according to claim 1 or 2, which has an ionic conductivity of at least $1 \times 10^{-5}$ S/cm and which is substantially insusceptive to oxidation and reduction at an electric potential in the range of from 1 to 3 V as measured relative to a reference electrode of metallic lithium.

4. The hybrid polymeric electrolyte according to claim 1, wherein said continuous solid polymer matrix is free of an ionic group and protonic hydrogen.

5. The hybrid polymeric electrolyte according to claim 1, wherein said continuous polymer matrix comprises a vinylidene fluoride polymer.

6. The hybrid polymeric electrolyte according to claim 1, wherein said non-aqueous electrolytic liquid is contained in an amount in the range of from 10 to 98% by weight, based on the weight of said hybrid polymeric electrolyte.

7. The hybrid polymeric electrolyte according to claim 1, wherein said crosslinked polymer segment is formed by electron beam irradiation.

8. The hybrid polymeric electrolyte according to claim 1, wherein said non-aqueous electrolytic liquid is a solution of an electrolyte in a non-aqueous solvent.

9. The hybrid polymeric electrolyte according to claim 8, wherein said electrolyte is a lithium salt.

10. The hybrid polymeric electrolyte according to claim 8, wherein said non-aqueous solvent comprises at least one compound selected from the group consisting of a carbonate compound and an ester compound.

11. The hybrid polymeric electrolyte according to claim 1, which is in the form of a sheet having a thickness of from 5 to 500 $\mu$m.

12. A method for producing a hybrid polymeric electrolyte according to claim 1, comprising impregnating a closed-cell cellular polymer foam with a non-aqueous electrolytic liquid, said polymer foam having a plurality of closed cells defined by cell walls constituting a continuous solid polymer matrix of said polymer foam.

13. The method according to claim 12, wherein the amount of said plurality of closed cells of the polymer foam is in the range of from 5 to 98% by volume, based on the entire volume of said polymer foam.

14. The method according to claim 13, wherein said plurality of closed cells comprise first and second fractions of closed cells, respectively, having a size of from 1 to 50 $\mu$m and a size of larger than 50 $\mu$m, each in terms of the average value of the long axis and short axis of each closed cell and wherein said first and second fractions of closed cells are, respectively, present in an amount of 60% or more by volume and in an amount of less than 40% by volume, each based on the total volume of said plurality of closed cells.

15. The method according to claim 12, wherein said impregnation of the polymer foam with the non-aqueous electrolytic liquid is conducted at a temperature of from 35 to 200° C.

16. The method according to claim 12, wherein said non-aqueous electrolytic liquid further comprises a swelling agent, and which further comprises removing at least a part of said swelling agent after said impregnation of the polymer foam with the non-aqueous electrolytic liquid.

17. The method according to claim 12, wherein said non-aqueous electrolytic liquid is used in an amount such that the produced hybrid polymeric electrolyte has an ionic conductivity of at least $1.0 \times 10^{-4}$ S/cm, and that the surface area of the produced electrolyte becomes 50 to 200%, relative to the surface area of the polymer foam prior to the impregnation with the non-aqueous electrolytic liquid.

18. The method according to claim 12, wherein said polymer foam has at least one construction selected from a construction in which said polymer foam comprises a crosslinked polymer segment having a crosslinked structure formed by electron beam irradiation, and a construction in which said polymer foam is in a stretched form.

19. A non-aqueous electrochemical device comprising at least two electrodes, and a hybrid polymeric electrolyte according to claim 1, wherein said at least two electrodes are disposed through said hybrid polymeric electrolyte.

20. An electrode comprising a particulate electrode material and a binder comprising a closed-cell cellular polymer foam comprising a plurality of closed cells defined by cell walls constituting a continuous solid polymer matrix of said polymer foam;

wherein said continuous solid polymer matrix comprises a crosslinked polymer segment and a non-crosslinked polymer segment, and wherein the weight ratio of the crosslinked polymer segment to the total weight of the crosslinked polymer segment and the non-crosslinked polymer segment is in the range of from 0.2 to 0.8.

21. The electrode according to claim 20, which is impregnated with a non-aqueous electrolytic liquid.

22. A method for producing an electrode according to claim 20, comprising molding a mixture of a particulate electrode material and a particulate closed-cell cellular polymer foam comprising a plurality of closed cells defined by cell walls constituting a continuous solid polymer matrix of said polymer foam.

23. A method for producing an electrode according to claim 20, comprising molding a mixture of a particulate electrode material and a polymer to obtain a molded product, and foaming the polymer in said molded product.

24. A non-aqueous electrochemical device comprising an electrode according to claim 21.

25. The non-aqueous electrochemical device according to claim 19, which is a lithium battery.

26. The non-aqueous electrochemical device according to claim 24, which is a lithium battery.

* * * * *